(12) United States Patent
Robb et al.

(10) Patent No.: US 12,105,936 B2
(45) Date of Patent: Oct. 1, 2024

(54) VIRTUAL COMMUTE

(71) Applicant: Microsoft Technology Licensing, LLC, Redmond, WA (US)

(72) Inventors: Leanna Holly Robb, Seattle, WA (US); Sandeep Seri, Bellevue, WA (US); Wendy Guo, Edmonds, WA (US); Charu Kwatra, Redmond, WA (US); Shruti Poddar, Redmond, WA (US); Helen Harmetz, Kirkland, WA (US); Chelly Ashley Jin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 17/230,882

(22) Filed: Apr. 14, 2021

(65) Prior Publication Data

US 2022/0334691 A1    Oct. 20, 2022

(51) Int. Cl.
  *G06F 3/0484* (2022.01)
  *G06N 20/00* (2019.01)
  *G06Q 10/109* (2023.01)

(52) U.S. Cl.
  CPC ......... *G06F 3/0484* (2013.01); *G06N 20/00* (2019.01); *G06Q 10/109* (2013.01)

(58) Field of Classification Search
  None
  See application file for complete search history.

(56) References Cited

U.S. PATENT DOCUMENTS 11,138,021 B1 * 10/2021 Rosenstein ............ G09G 5/14
11,257,494 B1 *  2/2022 Zhong .................. G06N 20/00
2004/0122830 A1 *  6/2004 Schwartz ............. G06F 16/972
2006/0111945 A1 *  5/2006 Tinsley ................ G06Q 30/08
                                                  705/38
2007/0067772 A1 *  3/2007 Bustamante .......... G06Q 10/06
                                                  718/100
2009/0210509 A1 *  8/2009 Plumpton ........... G06Q 10/109
                                                  707/999.003

(Continued)

OTHER PUBLICATIONS

Tools to help you achieve your own personal sense of digital wellbeing, Retrieved from: https://web.archive.org/web/20210210071805/https:/wellbeing.google/tools/, Feb. 10, 2021, 12 Pages.

(Continued)

*Primary Examiner* — Henry Orr
(74) *Attorney, Agent, or Firm* — Foley IP Law, PLLC

(57) ABSTRACT

The disclosure herein describes a virtual commute experience system. In some examples, the virtual commute experience includes receiving a plurality of information from one or more different programs; in response to a trigger event, launching a virtual commute experience; in response to the launch of the virtual commute experience, displaying a first portion of the plurality of information from the one or more different programs; receiving a first user interaction; in response to receiving the first user interaction, displaying a second portion of the plurality of information; receiving a second user interaction; outputting a prompt to continue or end the virtual commute experience; and in response to receiving a response to the prompt to end the virtual commute experience, pausing notifications generated by one or more different programs via the user interface until another trigger event.

17 Claims, 14 Drawing Sheets

(56) References Cited

U.S. PATENT DOCUMENTS

| | | | | |
|---|---|---|---|---|
| 2013/0345978 | A1* | 12/2013 | Lush | G01C 21/3484 |
| | | | | 701/533 |
| 2016/0026346 | A1* | 1/2016 | Wakeen | G06Q 10/107 |
| | | | | 715/753 |
| 2017/0099592 | A1 | 4/2017 | Loeb et al. | |
| 2018/0082265 | A1 | 3/2018 | Chan et al. | |
| 2019/0027052 | A1* | 1/2019 | Moore | G09B 19/00 |
| 2019/0205839 | A1* | 7/2019 | Dotan-Cohen | H04L 67/535 |
| 2020/0402019 | A1* | 12/2020 | Truong | G06Q 10/1093 |
| 2020/0402020 | A1 | 12/2020 | Bergen et al. | |
| 2022/0038410 | A1* | 2/2022 | Bhargava | H04L 51/046 |
| 2022/0147369 | A1* | 5/2022 | Kraus | G06F 9/4406 |
| 2022/0223064 | A1* | 7/2022 | Chauhan | G09B 7/00 |

OTHER PUBLICATIONS

Binnewies, et al., "Recovery during the weekend and fluctuations in weekly job performance: A week-level study examining intra-individual relationships", In Journal of Occupational and Organizational Psychology, vol. 83, Issue 2, Jun. 2010, pp. 419-441.

Brosschot, et al., "Expanding stress theory: Prolonged activation and perseverative cognition", In Journal of Psychoneuroendocrinology, vol. 30, Issue 10, Nov. 2005, pp. 1043-1044.

Cote, Alexandra, "Working Remotely: A Complete Guide to Turn You into a Pro", Retrieved from: https://www.paymoapp.com/blog/working-remotely/, Mar. 31, 2020, 44 Pages.

Cropley, et al., "The Relationship Between Work-Related Rumination and Evening and Morning Salivary Cortisol Secretion", In Journal of Stress and Health, Oct. 25, 2013, 27 Pages.

Ellen, Rachel, "15 Hacks for Working from Home", Retrieved from: https://www.youneedabudget.com/15-hacks-for-working-from-home/, Mar. 16, 2020, 9 Pages.

Etherington, Darrell, "Apple Patents a Smart To-Do List That Uses Contextual Information From Your iPhone to Fill The Gaps", Retrieved from: https://techcrunch.com/2012/12/06/apple-patents-a-smart-to-do-list-that-uses-contextual-information-from-your-iphone-to-fill-the-gaps/, Dec. 6, 2012, 30 Pages.

Hegele, et al., "Balancing work and life under one roof", Retrieved from: https://insights.office.com/workplace-analytics/balancing-work-and-life-under-one-roof/, Apr. 22, 2020, 19 Pages.

Kudva, Prithvi, "Designing for Digital Wellbeing", Retrieved from: https://web.archive.org/web/20201208203507/https:/www.bentley.edu/centers/user-experience-center/designing-digital-wellbeing, Dec. 8, 2020, 8 Pages.

Sonnentag, et al., "Recovery from job stress: The stressor-detachment model as an integrative framework", In Journal of Organizational Behavior, vol. 36, Feb. 2015, 33 Pages.

* cited by examiner

VIRTUAL COMMUTE

BACKGROUND

Historically, the commute to work, whether by car, train, subway, bus, bicycle, etc., provided physical and temporal boundaries between personal time and the beginning of the workday and the commute home from work provided physical and temporal boundaries between the end of the workday and personal time. As the implementation of remote work increases, these commute times are eliminated. While reducing or eliminating the commute time can save time, the subtle wellbeing benefits of commute times are lost, leading to feelings of being "always on" among the workforce. The feeling of being "always on" can blur the line between personal time and work time, which is an unhealthy trend and can negatively impact wellbeing. For example, failing to adequately detach from work has been shown to yield elevated levels of stress as a result of reflections about unfinished tasks or stressful work-related events even outside of work hours.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized system and method for a virtual commute experience is provided. The system includes a user interface, a processor communicatively coupled to the user interface, and a computer-readable medium storing instructions. The instructions are operative, upon execution by the processor, to cause the processor to: receive a plurality of information from one or more different programs, the plurality of information having one or more data formats; in response to a trigger event, launch a virtual commute experience via the user interface; in response to the launch of the virtual commute experience, display, on the user interface, a first portion of the plurality of information from the one or more different programs, the first portion having a first data format; receive a first user interaction to the first portion of the plurality of information; in response to receiving the first user interaction, display a second portion of the plurality of information, the second portion having a second data format different from the first data format; receive a second user interaction to the second portion of the plurality of information; output a prompt to continue or end the virtual commute experience; and in response to receiving a response to the prompt to end the virtual commute experience, pause notifications generated by one or more different programs via the user interface until another trigger event.

Other examples provide a computer-implemented method. The computer-implemented method includes receiving a plurality of information from one or more different programs, the plurality of information having one or more data formats; in response to a trigger event, launching a virtual commute experience via the user interface; in response to the launch of the virtual commute experience, displaying, on the user interface, a first portion of the plurality of information from the one or more different programs, the first portion having a first data format; receiving a first user interaction to the first portion of the plurality of information; in response to receiving the first user interaction, displaying a second portion of the plurality of information, the second portion having a second data format different from the first data format; receiving a second user interaction to the second portion of the plurality of information; outputting a prompt to continue or end the virtual commute experience; and in response to receiving a response to the prompt to end the virtual commute experience, pausing notifications generated by one or more different programs via the user interface until another trigger event.

Still other examples provide one or more computer-readable storage media for providing a virtual commute experience comprising a plurality of instructions that, when executed by a processor, cause the processor to: receive a plurality of information from one or more different programs, the plurality of information having one or more data formats; in response to a trigger event, launch a virtual commute experience via the user interface; in response to the launch of the virtual commute experience, display, on the user interface, a first portion of the plurality of information from the one or more different programs, the first portion having a first data format; receive a first user interaction to the first portion of the plurality of information; in response to receiving the first user interaction, display a second portion of the plurality of information, the second portion having a second data format different from the first data format; receive a second user interaction to the second portion of the plurality of information; output a prompt to continue or end the virtual commute experience; and in response to receiving a response to the prompt to end the virtual commute experience, pause notifications generated by one or more different programs via the user interface until another trigger event.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 17, the systems are illustrated as schematic drawings. The drawings may not be to scale.

DETAILED DESCRIPTION

Figure 1:
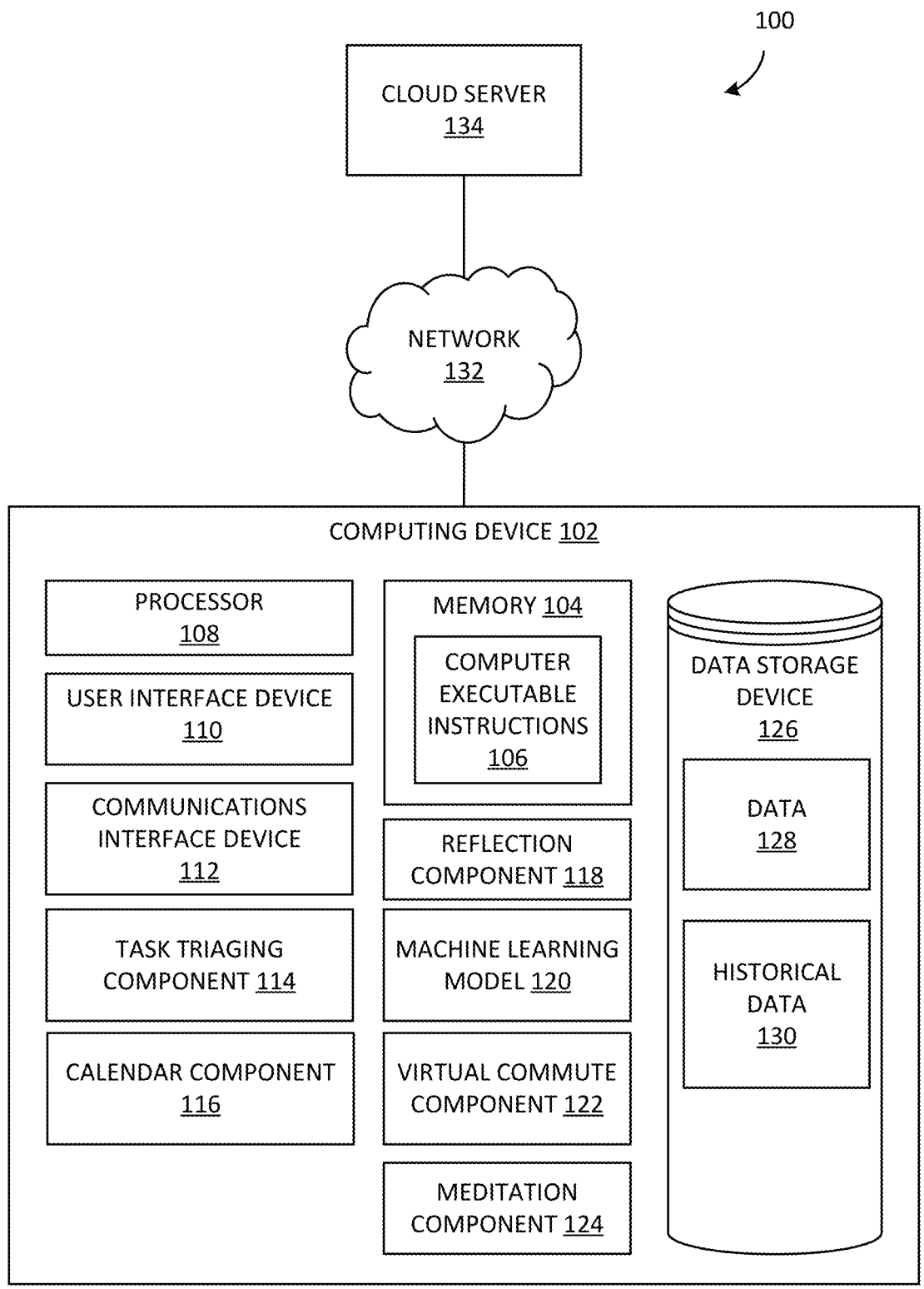
FIG. 1 is a block diagram illustrating a system for a virtual commute experience according to an example.

Aspects of the disclosure provide a computerized method and system for a virtual commute experience that enables a user to mindfully connect to work at the beginning of the workday and mindfully disconnect from work at the conclusion of the workday. The virtual commute experience ties into external programs the user utilizes throughout the workday to celebrate the day's accomplishments, prepare a plan to address outstanding items during the next workday, reflect on the workday, and set a boundary between the workday and personal life by blocking, or pausing, work-related notifications during non-working hours. Accordingly, the virtual commute experience enables the user to, at the end of the workday, ease out of a work mindset and into a home mindset and, at the beginning of the workday, ease out of a home mindset and into a work mindset.

Accordingly, the system provided in the present disclosure operates in an unconventional manner by providing an improved system and user interface, or user interface device, that blocks work-related notifications at the conclusion of a virtual commute experience that identifies the end of working hours in order to set temporal boundaries for a user between work and personal life. The improved system is launched in response to receiving a trigger, such as a particular input from the user or a particular time each workday, signaling a conclusion of the workday to the user. Using the virtual commute experience via the user interface provides the user with streamlined access to multiple additional applications through one unified virtual commute system, which provides task lists, reflection components, calendar components, and so forth but also enables data in those applications to be reviewed, updated, modified, added to, removed, and so forth from a singular interface. As such, the user interface provides an improved mechanism to disconnect the user from work and transition to home on a virtual commute experience away from work or to transition into work on a virtual commute experience into work.

Furthermore, the conventional solutions provided fail to provide true boundaries between work and personal life. For example, current solutions fail to launch in response to a trigger or block notifications. These solutions can include providing entertainment, such as music, a podcast, an audiobook, or a radio program, to distinguish the workday from personal time, but fail to provide technical solutions that are used to improve the productivity and wellbeing of the user.

Accordingly, aspects of the present disclosure describe a system for a virtual commute experience that establishes clear boundaries between the workday and personal life and, during personal time outside of the workday, blocks work-related notifications to continue to reinforce the boundaries until the next workday. The virtual commute experience accesses various application the user uses throughout the workday to allow the user to review and reflect on the workday, prepare for the next workday, and establish a boundary for the upcoming personal time and transition into a personal time mindset.

Aspects of the present disclosure further describe a system for a virtual commute experience that prepares a user for an upcoming workday. The virtual commute experience accesses various application the user uses throughout the workday to allow the user to review the previous workday, prepare for the upcoming workday, and remove boundaries for personal time to allow the user to transition into a work mindset.

FIG. 1 is a block diagram illustrating a system for a virtual commute experience according to an example. The system 100 illustrated in FIG. 1 is provided for illustration only. Other examples of the system 100 can be used without departing from the scope of the present disclosure.

The system 100 includes a computing device 102, a network 132, and a cloud server 134. The computing device 102 represents any device executing computer-executable instructions 106 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 includes at least one processor 108, a memory 104 that includes the computer-executable instructions 106, and a user interface device 110. The processor 108 includes any quantity of processing units and is programmed to execute the computer-executable instructions 106. The computer-executable instructions 106 are performed by the processor 108, performed by multiple processors within the computing device 102, or performed by a processor external to the computing device 102. In some examples, the processor 108 is programmed to execute computer-executable instructions 106 such as those illustrated in the figures described herein, such as FIGS. 5, 6, 8, 9, 15, and/or 16. In various examples, the processor 108 is configured to execute one or more of the task triaging component 114, the calendar component 116, the reflection component 118, the virtual commute component 122, and the meditation component 124.

The memory 104 includes any quantity of media associated with or accessible by the computing device 102. The memory 104 in these examples is internal to the computing device 102, as illustrated in FIG. 1. In other examples, the memory 104 is external to the computing device 102 or both internal and external to the computing device 102. For example, the memory 104 can include both a memory component internal to the computing device 102 and a memory component external to the computing device 102. The memory 104 stores data, such as one or more applications. The applications, when executed by the processor 108, operate to perform various functions on the computing device 102. The applications can communicate with counterpart applications or services, such as web services accessible via the network 132. In an example, the applications represent downloaded client-side applications that correspond to server-side services executing in a cloud, such as the cloud server 134.

The user interface device 110 includes a graphics card for displaying data to a user and receiving data from the user. The user interface device 110 can also include computer-executable instructions, for example a driver, for operating the graphics card. Further, the user interface device 110 can include a display, for example a touch screen display or natural user interface, and/or computer-executable instructions, for example a driver, for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

In some examples, the user interface device 110 is configured to launch and display a virtual commute experience, such as the virtual commute component 122, in response to a trigger event. For example, the processor 108 can execute the computer-executable instructions 106 stored in the memory 104 to launch the virtual commute component 122 on the user interface device 110 in response to the trigger event. As part of launching and displaying the virtual commute component 122, the user interface device 110 can provide prompts to receive user inputs, display data to the user in response to the processor 108 processing and analyzing the inputs, and block, or pause, notifications from other different applications or programs to the user in response to a conclusion of the virtual commute experience. As such, the user interface device 110 and the virtual commute component 122 enable the user to wrap up and reflect on a completed workday, prepare for the next workday, and establish boundaries between the workday and personal life.

The computing device 102 further includes a communications interface device 112. The communications interface device 112 includes a network interface card and/or computer-executable instructions, such as a driver, for operating the network interface card. Communication between the computing device 102 and other devices, such as but not limited to the cloud server 134, can occur using any protocol or mechanism over any wired or wireless connection. In some examples, the communications interface device 112 is operable with short range communication technologies such as by using near-field communication (NFC) tags.

The computing device 102 further includes a data storage device 126 for storing data, such as, but not limited to data 128 and/or historical data 130. The data 128 can be data provided by the user via the user interface device 110 during execution of the virtual commute component 122 and/or data collected by one or more of various other components of the computing device 102, including but not limited to a task triaging component 114, a calendar component 116, a reflection component 118, a machine learning model 120, and a meditation component 124. The data storage device 126 can include one or more different types of data storage devices, such as, for example, one or more rotating disks drives, one or more solid state drives (SSDs), and/or any other type of data storage device. The data storage device 126 in some non-limiting examples includes a redundant array of independent disks (RAID) array. In other examples, the data storage device 126 includes a database.

The data storage device 126, in this example, is included within the computing device 102, attached to the computing device 102, plugged into the computing device 102, or otherwise associated with the computing device 102. In other examples, the data storage device 126 includes a remote data storage accessed by the computing device 102 via the network 132, such as a remote data storage device, a data storage in a remote data center, or a cloud storage.

In some examples, a task triaging component 114 is provided. The task triaging component 114 may be implemented in the computing device 102 or implemented remotely from the computing device 102 and accessed by the computing device 102 via the network 132. In other examples, the task triaging component 114 is a remote component accessed by the computing device 102 via the network 132. The task triaging component 114 manages tasks for the user to complete and organizes the tasks into tasks to be completed during a particular day, week, month, quarter, and so forth. The tasks can include various work-related tasks, including but not limited to projects to be completed, reminder emails to be sent, phone calls or conference calls to be completed, administrative tasks, and so forth, and non-work-related tasks, such as personal tasks. Personal tasks can be any tasks to be completed by the user but that are not necessarily work-related, for example tasks including, but not limited to, scheduling a doctor's appointment, paying bills, compiling a grocery list, and so forth. In some examples, the task triaging component 114 can be accessed by the user to be reviewed, modified, and so forth. For example, the task triaging component 114 can be accessed by the user to add new tasks, view tasks, update tasks from incomplete to complete, update tasks from complete to incomplete, modify tasks to include additional information, remove tasks, and so forth. In some examples, the tasks managed by the task triaging component 114 are stored as data 128 and/or historical data 130 in the data storage device 126.

In some examples, a calendar component 116 is provided. The calendar component 116 may be implemented in the computing device 102 or implemented remotely from the computing device 102 and accessed by the computing device 102 via the network 132. The calendar component 116 manages events on an electronic calendar for the user and organizes the events into time- and date-based events. The events can include various work-related events and/or non-work-related events. Work-related events can include, but are not limited to, work-related meetings, deadlines, conference calls, and so forth, whereas non-work-related events can include, but are not limited to, non-work-related meetings, appointments, calls, and so forth. In some examples, the calendar component 116 can be accessed by the user to be reviewed, modified, and so forth. For example, the calendar component 116 can be accessed by the user to add new calendar events, RSVP to calendar events, view calendar events, update calendar events, update calendar events, modify calendar events to include additional information, remove calendar events, and so forth. In some examples, the calendar events managed by the calendar component 116 are stored as data 128 and/or historical data 130 in the data storage device 126.

In some examples, a reflection component 118 is provided. The reflection component 118 can be included within the computing device 102, attached to the computing device 102, plugged into the computing device 102, or otherwise associated with the computing device 102. In other examples, the reflection component 118 is a remote component accessed by the computing device 102 via the network 132. The reflection component 118 manages reflections of the user. For example, the reflection component 118 can prompt the user to reflect on the workday by including a question associated with the emotional well-being of the user. The prompt can be displayed within the user interface device 110 at an occurrence of a user-configured prompt time-interval. The prompt can include at least one emotional state depiction, such as, but not limited to, a set of emotional state depictions. An emotional state depiction is an image or word depiction representing an emotional state, whereby a selection of an individual emotional state depiction indicates a current emotional state of the user. In other words, the set of emotional state depictions represent a set of potential emotions or emotional states of the user. The user can select one of the depictions in the set of emotional state depictions as a response to the prompt. The set of emotional state depictions are described in greater with regard to the description of FIG. 13 below. The reflection data, such as the emotional state of the user, can be stored as data 128 and/or historical data 130 in the data storage device 126.

In some examples, the meditation component 124 is provided. The meditation component 124 can be included within the computing device 102, attached to the computing device 102, plugged into the computing device 102, or otherwise associated with the computing device 102. In other examples, the meditation component 124 is a remote component accessed by the computing device 102 via the network 132. The meditation component 124 can include various images, animations, gifs, text, and so forth used to more effectively transition the user from a work mindset to a personal mindset, in the case of a virtual commute experience from work to home, or from a personal mindset to a work mindset, in the case of a virtual commute experience from home to work. In various examples, the meditation component 124 is implemented on the user interface device 110 to present, to the user, meditation exercises, breathing exercises, and so forth that are designed to calm a user and ease the mindset transition.

In some examples, the task triaging component 114, the calendar component 116, the reflection component 118, and the meditation component 124 communicate with each other and with the virtual commute component 122. For example, in response to the user creating a calendar entry for a work-related meeting that is stored in the calendar component 116, the task triaging component 114 can automatically generate a new task for the user to send a meeting agenda to all co-workers who affirmatively RSVP to the calendar entry. As another example, in response to the reflection component 118 receiving an input from the user indicating a stressful emotional state, the calendar component 116 can generate a calendar entry for the user to have lunch with a co-user and/or the task triaging component 114 can generate a task to perform a stress-relieving task such as exercise.

In some examples, a machine learning model 120 is provided. The machine learning model 120 can be included within the computing device 102, attached to the computing device 102, plugged into the computing device 102, or otherwise associated with the computing device 102. In other examples, the machine learning model 120 is a remote component accessed by the computing device 102 via the network 132. The machine learning model 120 processes and analyzes data, such as the data 128, gathered by one or more elements of the computing device 102 such as the task triaging component 114, the calendar component 116, the reflection component 118, and the meditation component 124 to refine and improve the virtual commute component 122 and the user interface device 110. For example, the machine learning model 120 may identify potential mappings or correlations between the data received from different components to generate inferences on how one data input in one component affects the data input in another component. As an example, the machine learning model 120 may analyze the calendar data and the reflection data to correlate a quantity of hours scheduled for meetings in a given time period associated with a reflection input indicating a negative emotional state. As another example, the machine learning model 120 can analyze interactions of the user with different elements of the computing device 102 to identify that each time the user has a particular quantity of hours in the day in meetings scheduled on the calendar component 116, the reflection component 118 identifies the user's emotional state as stressed. Accordingly, the machine learning model 120 learns that the user's emotional state is improved by maintaining meetings for fewer hours of the day and therefore proactively blocks out time on the user's calendar in advance to avoid meetings being scheduled for too much of the user's day.

The network 132 is implemented by one or more physical network components, such as, but without limitation, routers, switches, network interface cards (NICs), and other network devices. The network 132 is any type of network for enabling communications with remote computing devices, such as, but not limited to, a local area network (LAN), a subnet, a wide area network (WAN), a wireless (Wi-Fi) network, or any other type of network. In this example, the network 132 is a WAN, such as the Internet. However, in other examples, the network 132 is a local or private LAN.

The cloud server 134 is a logical server providing services to the computing device 102 or other clients. The cloud server 134 is hosted and/or delivered via the network 132. In some non-limiting examples, the cloud server 134 is associated with one or more physical servers in one or more data centers. In other examples, the cloud server 134 is associated with a distributed network of servers. In some examples, the cloud server 134 communicates the computing device 102 via the network 132.

Figure 2:
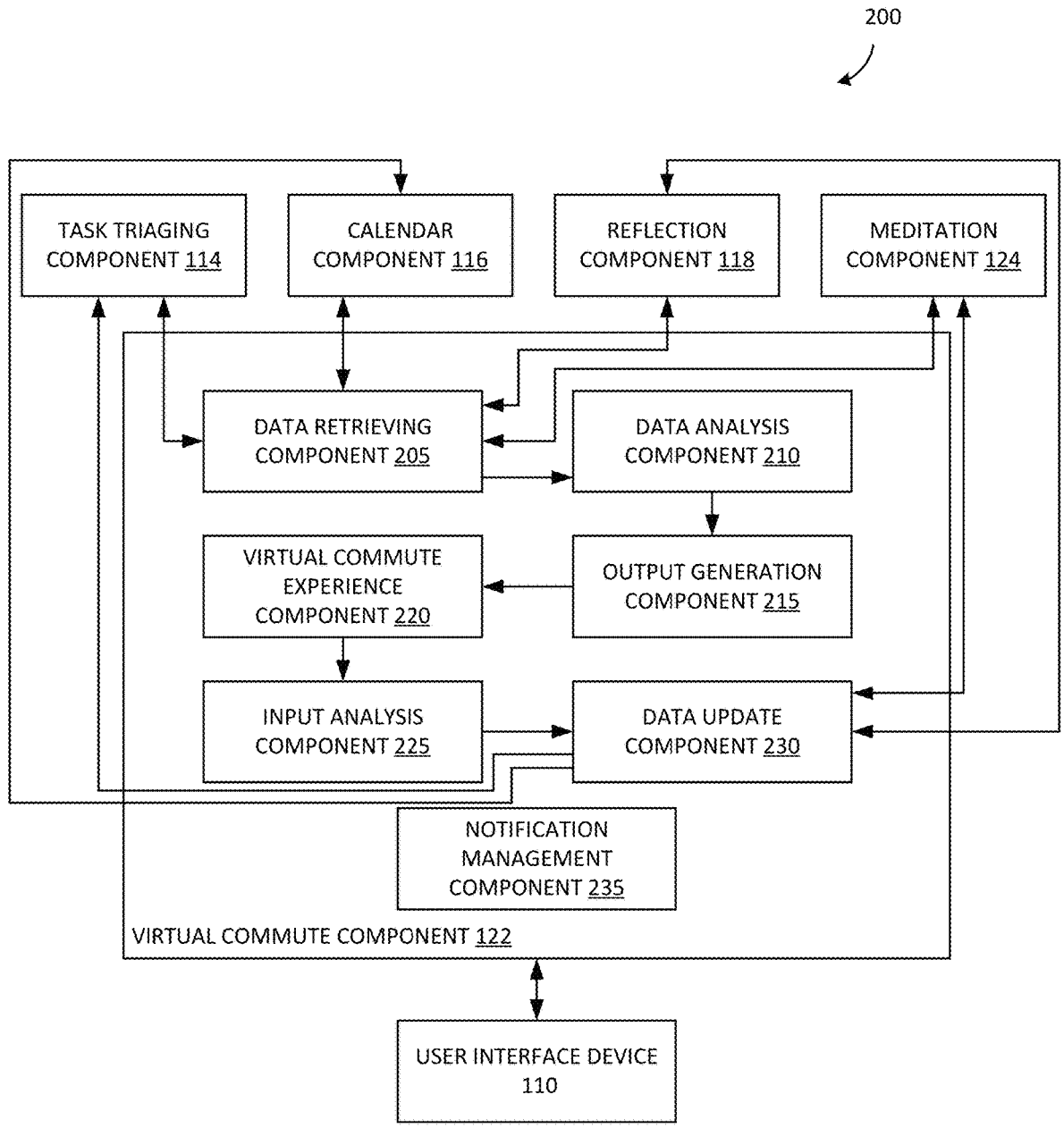
FIG. 2 is a block diagram illustrating a system for a virtual commute component according to an example.

FIG. 2 is a block diagram illustrating a system for a virtual commute component according to an example. The system 200 illustrated in FIG. 2 is provided for illustration only. Other examples of the system 200 can be used without departing from the scope of the present disclosure. In some examples, the system 200 includes one or more components of the system 100 illustrated in FIG. 1. For example, the system 200 includes the user interface device 110, the task triaging component 114, the calendar component 116, the reflection component 118, the virtual commute component 122, and the meditation component 124.

As shown in FIG. 2, the virtual commute component 122 includes a data retrieving component 205, a data analysis component 210, an output generation component 215, a virtual commute experience component 220, an input analysis component 225, a data update component 230, and a notification management component 235. The data retrieving component 205 retrieves, accesses, or receives, data from one or more components or programs of the computing device 102 such as the task triaging component 114, the calendar component 116, the reflection component 118, and the meditation component 124. In other words, the data retrieving component 205 accesses task data, calendar data, reflection data, meditation data and/or any other suitable data for use in the virtual commute experience. The accessed data can be provided in different formats and from different sources. The data analysis component 210 analyzes the obtained data accessed by the data retrieving component 205 to identify the particular data to be presented to the user based on one or more parameters and/or rules. For example, the data retrieving component 205 may obtain task data from the task triaging component 114 that includes all upcoming or incomplete to-do tasks. Based on configurable parameters set for the virtual commute experience, the data analysis component 210 identifies a sub-set of the retrieved tasks for use in the virtual commute experience. For example, not all to-do tasks stored in the task triaging component 114 may be presented to the user during the virtual commute experience. The parameters can specify that only to-do tasks assigned for the current or instant workday that remain incomplete at the time of the virtual commute experience launch are to be presented to the user during the virtual commute experience. Accordingly, the data analysis component 210 determines the type of tasks to be presented based on parameters, rules, or other configurable settings. In some examples, these parameters or settings may be dynamically configured based on user feedback during one or more virtual commute experiences. In other examples, these parameters or settings may be manually configured by a user during a set-up experience of the virtual commute function. In still other examples, these parameters and settings may be initially configured in a default setting, and later dynamically or manually reconfigured to customize the experience to an individual user.

As another example, the parameters may specify that the only calendar data to be presented to the user during the virtual commute experience is calendar entries for the next workday that have yet to receive an RSVP. Accordingly, the data analysis component 210 determines the portions of the retrieved data that are to be used for presentation and/or interaction during the virtual commute experience.

The output generation component 215 then generates an output, for presentation via the user interface device 110, that displays the portion of data identified by the data analysis component 210. In some examples, the output generated by the output generation component 215 is an interactive output that elicits user interaction through the virtual commute experience. As described herein, a user interaction can be an input received via the user interface device 110 that interacts with the data at its local host, such as the source program or application that manages the particular data. For example, the output generation component 215 can display an incomplete task that is surfaced via the task triaging component 114. In some examples, the output that is output by the output generation component 215 and displayed via the user interface device 110 elicits a user interaction with the incomplete task, such as marking the incomplete task as complete or skipping the incomplete task.

The virtual commute experience component 220 can be the interactive presentation of the portion of information that is output by the output generation component 215 via the user interface device 110. The virtual commute experience component 220 is presented to a user to elicit an input response, which is received in response to the virtual commute experience component 220. The input response is analyzed by the input analysis component 225, described in greater detail below.

The input analysis component 225 receives and analyzes the user input, i.e., the user interaction, received via the user interface device 110 in response to the virtual commute experience component 220. In some examples, the input analysis component 225 analyzes the input to identify the purpose, i.e., the intent, of the input received from the user in response to the output generated by the output generation component 215 in order to identify how to update, or instruct to update, the local data host such as the task triaging component 114, the calendar component 116, and so forth. For example, in the example above where the user interaction marks a previously labeled incomplete task as complete, the input analysis component 225 identifies that the task triaging component 114 is to be updated to mark the particular task complete. In some examples, the input analysis component 225 determines, based on a metric, which is the appropriate program or application to send the data update to, based on the received input. For example, based on the data source and data format of the portion of information being presented being identified as calendar data, the input response is identified, tagged, labeled, or annotated as corresponding to the calendar component 116. In various examples, the metric is based on the data format or based on the response that is tied to the data source, such as the local host, of the generated prompt that elicited the response.

The data update component 230 updates the data at the local host as identified by the input analysis component 225. In some examples, where the input analysis component 225 identifies that the task triaging component 114 is to be updated to mark the particular task complete, the data update component 230 directly accesses the task triaging component 114 to update the task data stored in the task triaging component 114 as specified by the user input. In other examples, the data update component 230 generates instructions to update the data at the local host and transmits the generated instructions to the local host. Based on received generated instructions, the local host updates the data stored in the program. Accordingly, the virtual commute experience is a cohesive program that enables the user to access and update data in external applications without separately opening each of the individual external applications. In other words, the user experience is streamlined to provide a single window of access, review, interaction, and update to multiple different programs within the virtual commute experience, without taking the user experience away from the virtual commute and into other application windows.

At the conclusion of the virtual commute experience, the notification management component 235 enters a quiet time period and pauses, or blocks, work-related notifications. For example, the notification management component 235 controls the user interface device 110 to prevent display or presentation of notifications from work-related sources for the duration of the quiet time period. As described herein, notifications can be identified as work-related automatically, such as based on the organizational email address, or based the user manually selecting notifications from particular individuals or organizations as work-related.

The virtual commute component 122 may include instructions, such as software, that are executed by the processor 108 to execute the data retrieving component 205, the data analysis component 210, the output generation component 215, the virtual commute experience component 220, the input analysis component 225, the data update component 230, and the notification management component 235. In one example, the virtual commute experience from work to home, such as at the conclusion of the workday, includes a review of tasks and/or calendar events for the workday, a preview of tasks and calendar events for the next workday, a reflection of the emotional wellbeing of the user, a meditation session, and an initiation of blocking work-related notifications during the personal time. In another example, the virtual commute experience from home to work, such as at the beginning of the workday, includes a review of the tasks and/or calendar events from the previous workday, a preview of the tasks and calendar events for the upcoming workday, a reflection of the emotional wellbeing of the user, a meditation session, and a removal of the blocking of work-related notifications.

An example virtual commute experience implemented by the virtual commute component 122 and displayed on the user interface device 110 can begin, in response to a trigger event, by presenting a review of tasks from the workday that are surfaced from the task triaging component 114. In some examples, the interactive presentation of selected tasks to the user via the user interface device 110 enables the user to add, modify, remove, and so forth various tasks from throughout the workday by inputting responses to one or more tasks at a time via the user interface device 110. For example, although a task list is not always open and visible to the user throughout the workday, the user is working on various tasks to accomplish. At the conclusion of the workday, the virtual commute experience presents one or more identified tasks from the workday to the user. The user can confirm the task was completed, request a reminder at a future date or time, remove the task from the task list, modify the task, and so forth via an input to the user interface device 110. In some examples, the virtual commute experience retrieves and surfaces calendar data retrieved from the calendar component 116 and presents the calendar data to the user to review one or more calendar events from the workday. Accordingly, the virtual commute experience provides an interactive and succinct summary of selected tasks and calendar entries from the workday. In some examples, the virtual commute experience provides a visual incentivization, such as a celebration, of the reviewed tasks and calendar entries. The celebration can celebrate the number of tasks completed, no tasks completed, an amount of time spent in breathing exercises, an amount of time spent in focus time work sessions, praises sent during the workday, and/or praises received during the workday. Some examples can further include viewing unfinished tasks that were due during the workday, viewing unfinished tasks that had a reminder set for the workday, and completed tasks. Some examples further include prompts for the user to provide an input to set reminders for one or more of the unfinished tasks, such as a reminder for the next workday, the next week, and a specific day and time. Some examples further include receiving confirmation for completed tasks, receiving confirmation for scheduling reminders, celebrate completing tasks for the workday, and an option to add additional tasks for the next workday. In some examples, tasks displayed during the virtual commute experience are sorted to provide a manageable, organized presentation for the user. For example, tasks can be sorted by priority, by when the tasks were created, i.e., from the newest tasks to the oldest or from the oldest to the newest, and so forth.

When inputs from the user addressing each of the tasks and/or calendar events from the workday, the virtual commute component 122 responds by presenting, via the user interface device 110, a preview of the next workday within the virtual commute experience. The preview includes one or more of task data surfaced from the task triaging component 114 for the next workday and calendar data surfaced from the calendar component 116 for the next workday. For example, the preview presented on the user interface device 110 identifies one or more of a first calendar event, such as a meeting or conference call, for the next workday, a quantity of calendar events found for the next workday, tasks to be completed during the next workday, and so forth. In some examples, the preview includes what time the user's day starts on the next workday. For example, the preview can show what time the first meeting of the next workday starts. In instances where the next day is a weekend day, the preview shows the time the user's day starts on the next workday, i.e., Monday. The virtual commute component 122 can include holiday data, vacation data, and so forth to more accurately identify workdays vs. non-workdays. For example, where a next day is a holiday, the virtual commute component 122 identifies the next day is not a workday and previews the next workday after the holiday.

In some examples, the preview includes how many meetings are scheduled for the next workday and/or an option to RSVP to meetings that have not yet been accepted or declined. The virtual commute experience can enable dynamic updates of the meetings list as RSVPs for the meetings are received. For example, the meeting count presented in the virtual commute experience decreases as meetings are declined and increases as meetings are accepted. The preview further provides the user an opportunity to address meetings conflicts by changing a response to a particular meeting. For example, a conflict exists where two meetings are scheduled for times that at least partially overlap. To remedy the conflict, the user can change the response to at least one of the meetings, suggest a new time for at least one of the meetings, and so forth. In some examples, the preview further allows the user to book focus time to help structure the day. Focus times can include blocks of time during the day where meetings or other calendar entries are not to be scheduled so as to help the user focus on their tasks for the day.

In some examples, the virtual commute experience further includes data surfaced from the reflection component 118 to display an interactive reflection on the completed workday via the user interface device 110. For example, the user interface device 110 can display a reflection message asking the user to reflect on the workday and prompt the user to enter an input indicating their perspective on the workday. The reflection message can include a selection of emotional state depictions that represent an emotional state and the prompt to enter the input can be a prompt to select the emotional state depiction that mostly closely resembles the current emotional state of the user. In so doing, the reflection allows the user to privately note their thoughts and feelings on the completed workday. In some examples, the reflection presents a personalized message to the user, via the user interface device 110, acknowledging the emotional state of the user. For example, where the emotional state of the user is low, the reflection can present an uplifting message to boost the user's morale. Where the emotional state of the user is high, the reflection can present an affirming message congratulating the user.

In some examples, the selected emotional state is stored in the data storage device 126 as data 128 and/or historical data 130. The data analysis component 210 of the virtual commute component 122 can analyze, via an analysis or algorithm, the emotional state data stored in the data storage device 126, data from the task triaging component 114, and/or data from the calendar component 116 to identify particular tasks and calendar entries that have a positive or negative correlation with the emotional state of the user. For example, the data analysis component 210 of the virtual commute component 122 can identify that the emotional state of the user tends to be more negative on days where a certain percentage of the day is spent in meetings or that the emotional state of the user tends to be more positive on days where a certain number of tasks are completed. In some examples, the results of the analyzed emotional state data can be used to suggest new tasks during the virtual commute experience component 220. For example, the output generation component 215 can output a suggested new calendar entry for an upcoming workday, via the virtual commute experience component 220, that blocks out time for the user to focus in order to prevent the certain percentage of the upcoming workday being spent in meetings.

In some examples, the virtual commute experience further retrieves and surfaces data from the meditation component 124 that is displayed via the user interface device 110. By retrieving and surfacing data from the meditation component 124, the virtual commute experience provides a mediation session to transition the user from a workday state of mind to a personal time state of mind. In some examples, the virtual commute experience includes breathing exercises and/or calming music to assist the user with the transition from the workday state of mind to the personal time state of mind. In some examples, the virtual commute experience can include visual depictions to assist in calming the user, such as a calming .gif image or animation. Examples of a calming .gif image or animation include, but are not limited to, leaves falling, a flower blooming, waves, and so forth. In some examples, the virtual commute experience can include one or more integrated meditation applications, such as third-party applications.

In some examples, the virtual commute experience concludes by blocking, or pausing, work-related notifications until the beginning of the next workday via the notification management component 235. Notifications can be identified as work-related automatically or based the user manually selecting notifications as work-related. For example, emails from the same organization as the user can be automatically flagged as work-related. The user can manually select other individuals or organizations, such as vendors, customers, and so forth, as work-related. The notification management component 235 can pause the work-related notifications during a quiet time, which can be for a specified period of time such as until the next workday begins, or until the user elects to begin receiving the work-related notifications. In some examples, the notification management component 235 pauses all notifications following the conclusion of the virtual commute experience and does not distinguish between work-related notifications and non-work-related notifications. In some examples, to pause the notifications, the notification management component 235 does not receive the notifications from external applications during the quiet time. In some examples, to pause the notifications, the notification management component 235 receives notifications from external applications but does not push the notifications to the user interface device 110 or any other device at which the user receives notifications. In some examples, in response to identifying a notification as non-work-related, the notification is not paused during the quiet time and is presented, or allowed to be presented, via the user interface device 110.

In some examples, notifications are displayed on the user interface device 110. In order for the notification management component 235 to block the notifications, the notification management component 235 can call an application programming interface (API) and/or command an API to block the notifications during quiet time and then call the API and/or command the API to cease blocking the notifications at the conclusion of quiet time.

As described herein, various examples of the present disclosure provide a virtual commute experience executed at one or both of the beginning of the workday to transition a user from a personal mindset to a work mindset and the conclusion of the workday to transition the user from a work mindset to a personal mindset. However, these examples are provided for illustration only and should not be construed as limiting. Various other examples are possible. In some examples, the virtual commute experience can be executed at a time other than the beginning or conclusion of the workday, such as in the middle of the day, to provide the user with a rest time or break throughout the workday. In some examples, only some of the elements of the virtual commute experience are executed. For example, the virtual commute experience can be configured to execute the meditation component in order to provide the user with the rest time during the day, but the workday preview and/or review may not be needed at that time.

Figure 3:
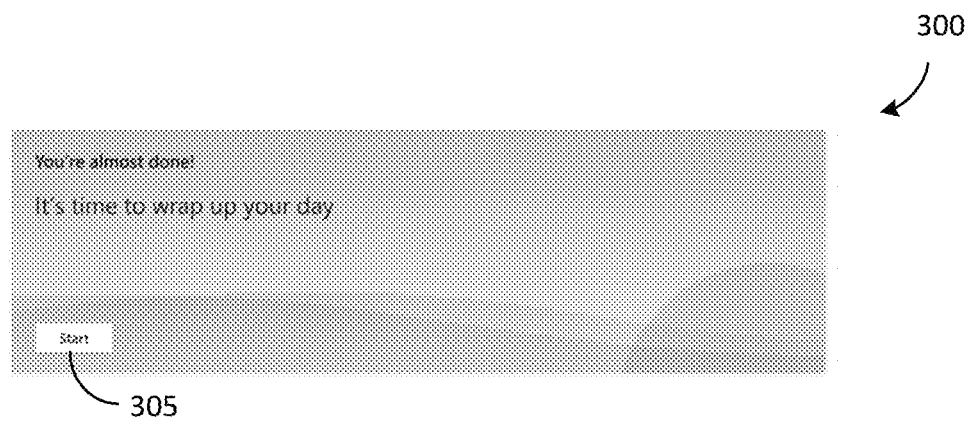
FIG. 3 is a block diagram illustrating a user interface displaying a home page card according to an example.

FIG. 3 is a block diagram illustrating a user interface displaying a home page card according to an example. The block diagram 300 illustrated in FIG. 3 is for illustration only. Other examples of a user interface displaying a home page card can be used without departing from the scope of the present disclosure.

Figure 7:
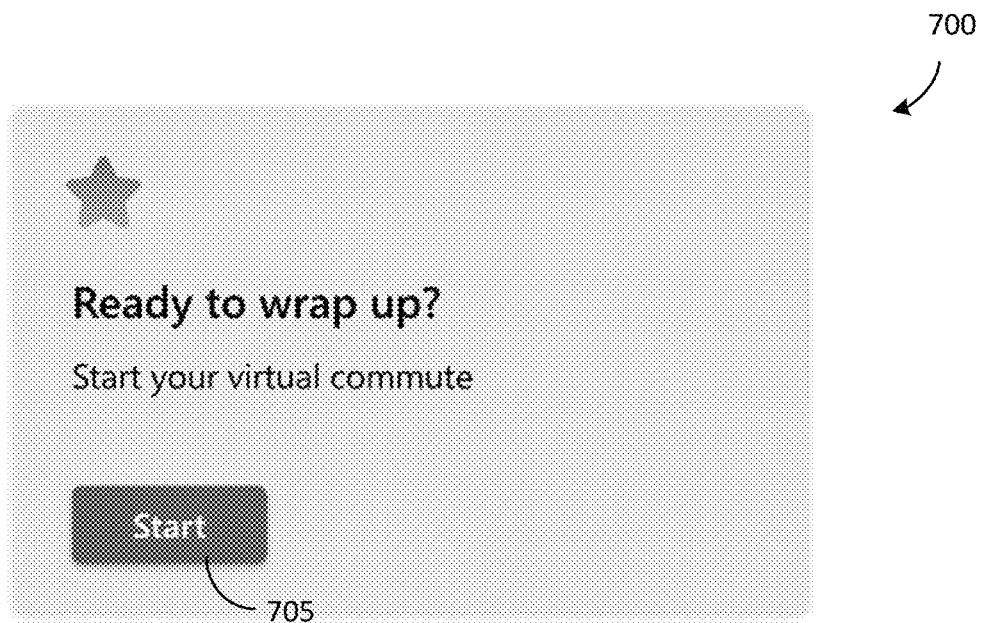
FIG. 7 is a block diagram illustrating a user interface displaying a protect time card for a recurring user according to an example.

The home page card illustrated in FIG. 3 is displayed on the user interface device 110 and includes text indicating to a user that it is time to wrap up the day. In some examples, the home page card is displayed at the same time, such as 5:00 PM, each workday. In other examples, the home page card is displayed at different times on different workdays based on the user's calendar. For example, the home page card can be displayed after the conclusion of the user's last meeting of the day. In some examples, the user can manually bring up the home page card to initiate the virtual commute experience. The home page card further includes a prompt for the user to begin the virtual commute experience, such as the start button 305. Selecting the start button is an example of a trigger event initiates the launch of the virtual commute experience. By selecting the start button 305, the user begins the virtual commute experience. A new user of the virtual commute experience is prompted to set up their virtual commute experience, as shown in FIG. 4, whereas a returning user of the virtual commute experience is prompted to start the virtual commute experience, as shown in FIG. 7.

Figure 4:
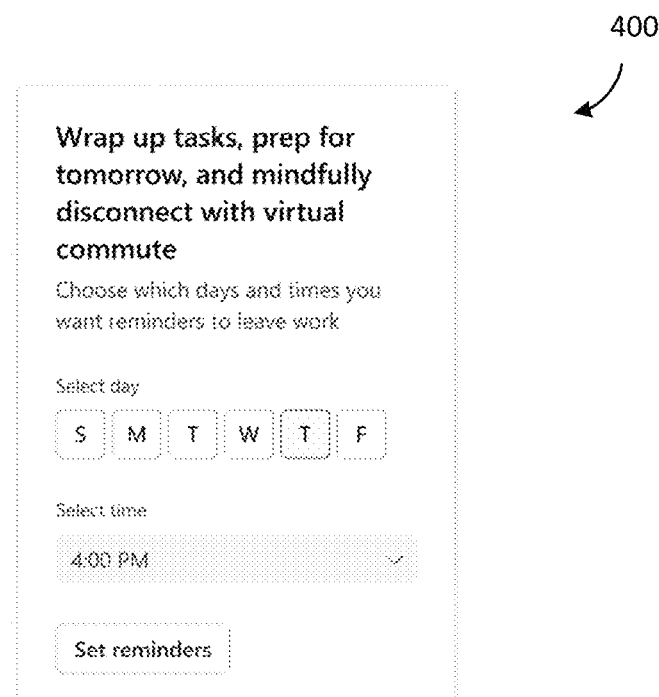
FIG. 4 is a block diagram illustrating a user interface displaying a protect time card for a new user according to an example.

FIG. 4 is a block diagram illustrating a user interface displaying a protect time card for a new user according to an example. The block diagram 400 illustrated in FIG. 4 is for illustration only. Other examples of a user interface displaying a protect time card for a new user can be used without departing from the scope of the present disclosure.

The protect time card illustrated in FIG. 4 is displayed on the user interface device 110 and includes text instructing the user on how to set up the virtual commute experience. The protect time card includes prompts for input that allow the user to select the days and times to receive reminders to leave work and transition to personal life. Reminders can be set for the same time each day or for different times on different days.

Figure 5:
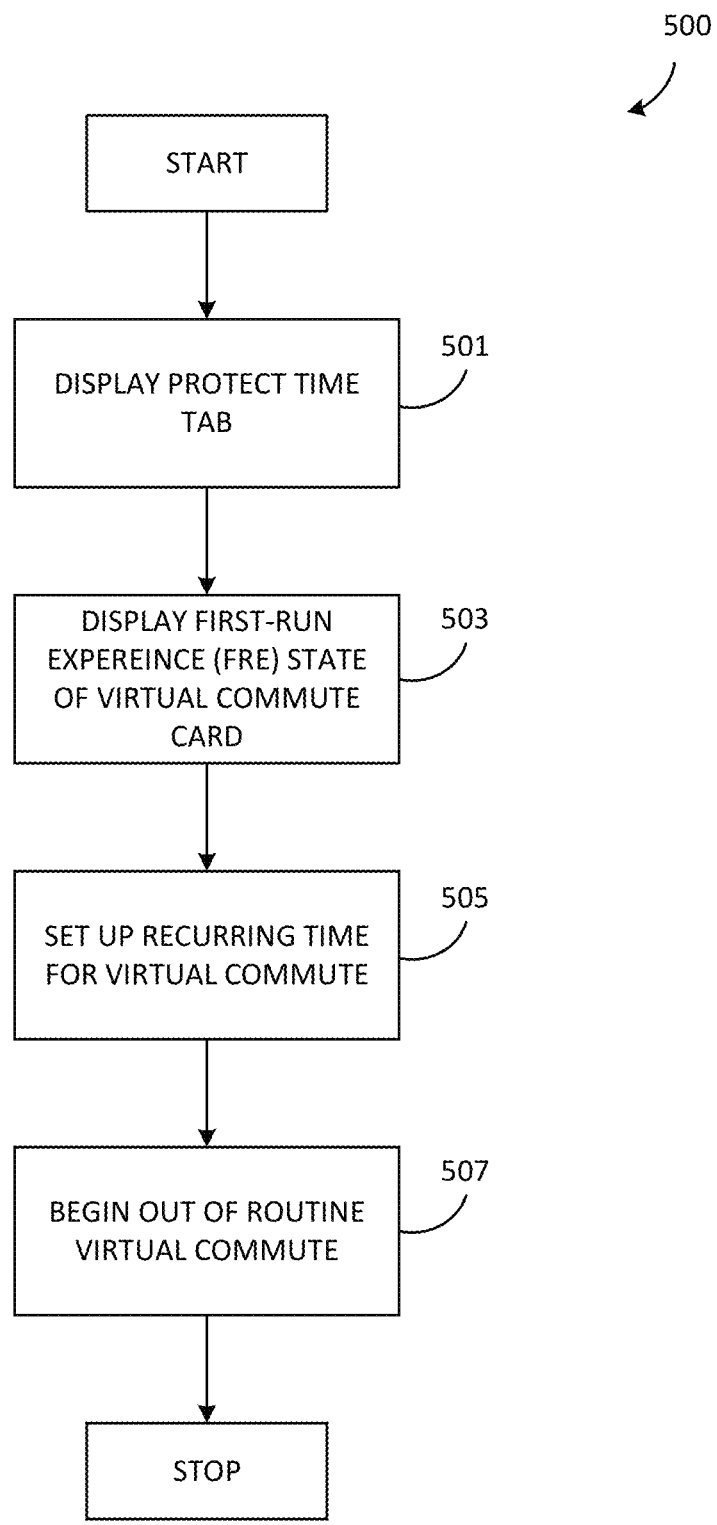
FIG. 5 is a flowchart illustrating operation of a virtual commute experience according to an example.

FIG. 5 is a flowchart illustrating operation of a virtual commute experience according to an example. The flowchart 500 illustrated in FIG. 5 is presented for illustration only and should not be construed as limiting. Other examples of the virtual commute experience can be used without departing from the scope of the present disclosure.

The flowchart 500 depicts a method that begins by displaying the protect time tab at operation 501. The protect time tab, such as the home page card illustrated in FIG. 3, is displayed on the user interface device 110 to prompt the user to transition from work to personal time. The protect time tab can be displayed on the user interface device 110 as a notification, a pop-up, or any other alert. In operation 503, the user interface device 110 displays a first run experience (FRE) state of the virtual commute card. The FRE state can include an overview of the virtual commute experience including what the virtual commute experience is, how it works, an example of a virtual commute experience, and so forth. The FRE state can further include instructions on how to set up the virtual commute experience and a prompt for a response by the user to initiate setup of the virtual commute experience.

In operation 505, the virtual commute component 122 sets up a recurring time for a virtual commute experience. For example, the virtual commute component 122 can prompt the user for input using the protect time card illustrated in FIG. 4 to set up recurring times on particular days to initiate the virtual commute experience. The recurring time can be a trigger event that initiates the launch of the virtual commute experience.

In operation 507, the virtual commute component 122 begins an out of routine virtual commute experience displayed on the user interface device 110. The virtual commute experience is considered out of routine because the virtual commute experience may not be initiated at the recurring time set in operation 505. The out of routine virtual commute experience is an introductory virtual commute experience that begins following the set-up of recurring times for the virtual commute experience and not a virtual commute experience begun at the recurring time.

Figure 6:
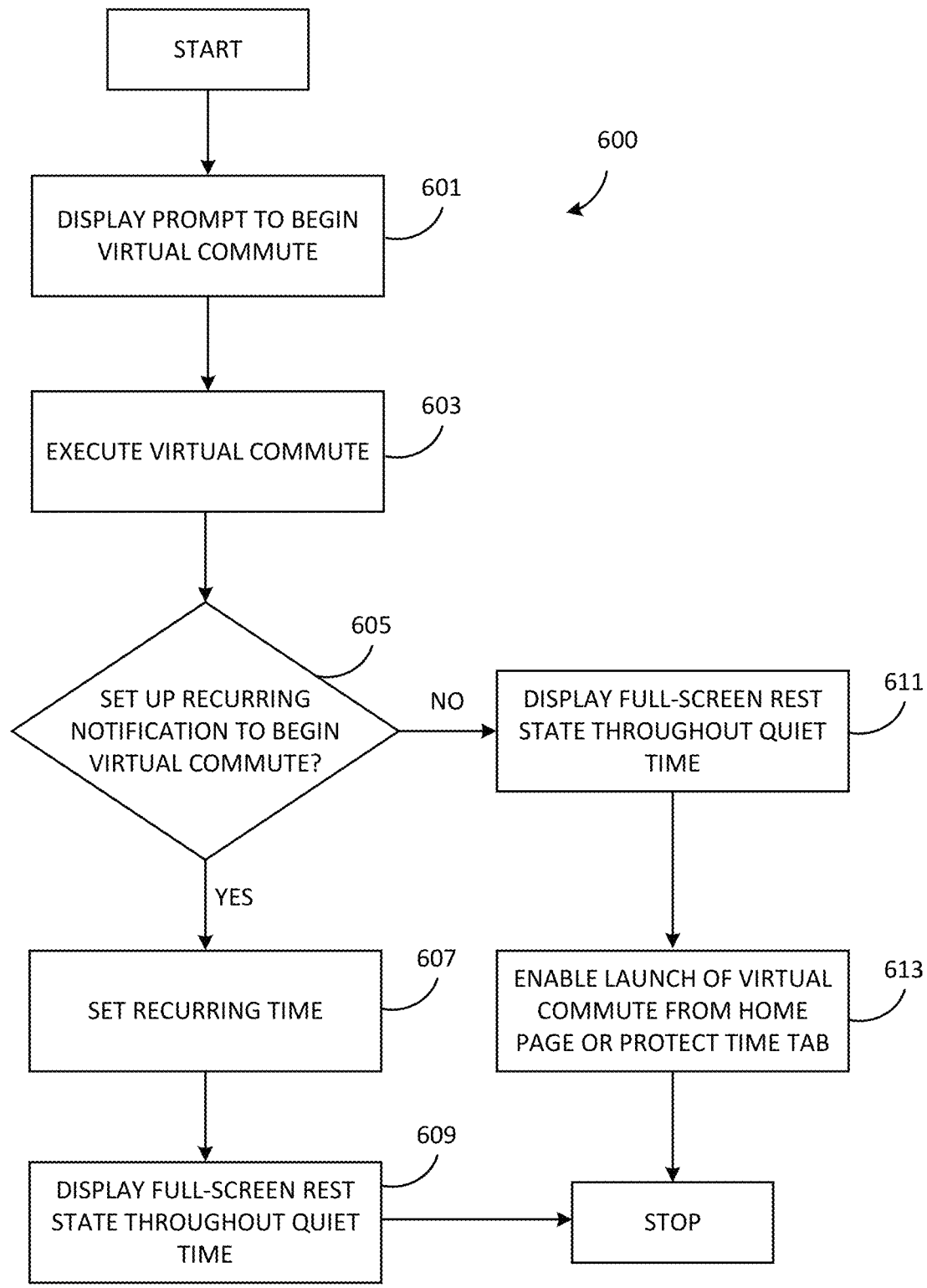
FIG. 6 is a flowchart illustrating operation of a virtual commute experience according to an example.

FIG. 6 is a flowchart illustrating operation of a virtual commute experience according to an example. The flowchart 600 illustrated in FIG. 6 is presented for illustration only and should not be construed as limiting. Other examples of the virtual commute experience can be used without departing from the scope of the present disclosure.

The flowchart 600 depicts a method that begins by displaying, via the user interface device 110, a prompt to begin the virtual commute experience in operation 601. The prompt to begin the virtual commute experience can be displayed from a home page, such as the home page card illustrated in FIG. 3. In operation 603, the virtual commute experience is executed in response to a trigger event, such as the user selecting the virtual commute experience or the virtual commute experience launching at a specified recurring time. For example, as described herein, the virtual commute experience can include one or more of reviewing tasks and calendar entries from the current workday, previewing tasks and calendar entries for the next workday, reflecting on the current workday, a meditation session to transition from a work mindset to a personal life mindset, and pausing work-related notifications at the conclusion of the virtual commute experience. In some examples, the virtual commute experience executed in operation 603 is the first virtual commute experience performed by the user.

In operation 605, at the conclusion of the virtual commute experience, the user is prompted, via the user interface device 110, to select whether or not to set up a recurring notification to begin the virtual commute experience. If the user selects to set up a recurring notification to begin the virtual commute experience, the method proceeds to operation 607. If the user selects not to set up a recurring notification to begin the virtual commute experience, the method proceeds to operation 609.

In operation 607, the user interface device 110 receives an input from the user accepting the prompt to set up recurring notifications to begin the virtual commute experience and sets the recurring time for the notification. The recurring notifications can be set up via the protect time card illustrated in FIG. 4. The recurring notifications are used to prompt the user to initiate the virtual commute experience at the set time each workday. In operation 609, the user interface device 110 displays a full-screen rest state throughout quiet time. Quiet time is the time following the virtual commute experience where the work-related notifications are paused. In various examples, quiet time continues until the user manually ends quiet time or until the beginning of the next workday.

In operation 611, the user interface device 110 receives an input from the user declining the prompt to set up recurring notifications to begin the virtual commute experience and displays a full-screen rest state throughout quiet time. In operation 613, the user interface device 110 enables the launch of the virtual commute experience ad-hoc from the home page or protect time tab at any time.

FIG. 7 is a block diagram illustrating a user interface displaying a protect time card for a recurring user according to an example. The block diagram 700 illustrated in FIG. 7 is for illustration only. Other examples of a user interface displaying a protect time card for a recurring user can be used without departing from the scope of the present disclosure.

The protect time card illustrated in FIG. 7 is a prompt for a recurring user to begin the virtual commute experience. In other words, the protect time card illustrated in FIG. 7 is for a user who has previously set up the virtual commute experience and is therefore not a new user. In some examples, the protect time card for a recurring user is an example of the recurring notification set by the user in operation 607, described above. The protect time card includes a prompt for the user to begin the virtual commute experience, such as the start button 705. By selecting the start button 705, the user begins the virtual commute experience.

Figure 8:
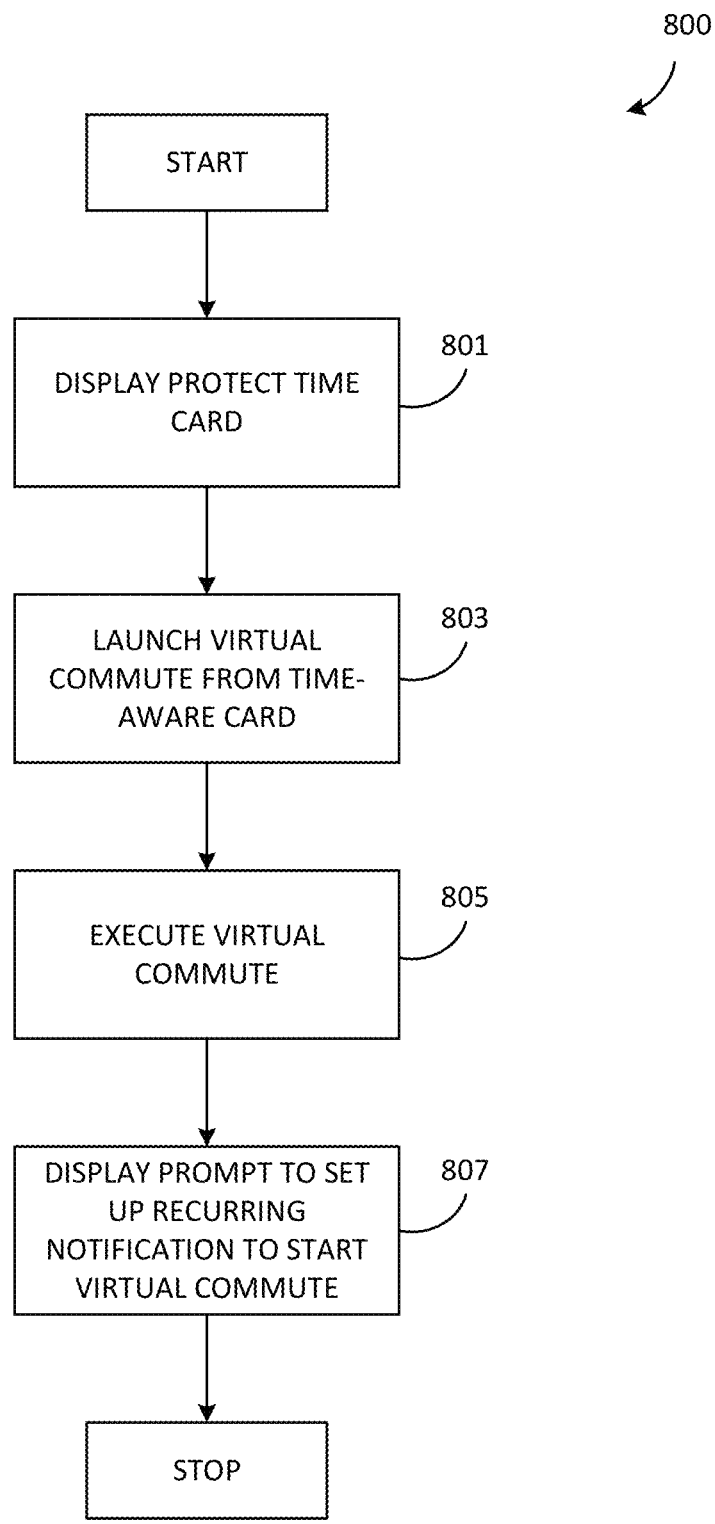
FIG. 8 is a flowchart illustrating operation of a virtual commute experience according to an example.

FIG. 8 is a flowchart illustrating operation of a virtual commute experience according to an example. The flowchart 800 illustrated in FIG. 8 is presented for illustration only and should not be construed as limiting. Other examples of the virtual commute experience can be used without departing from the scope of the present disclosure. The flowchart 800 indicates a method for a virtual commute experience where recurring notifications are not set up.

The flowchart 800 depicts a method that begins by displaying, via the user interface device 110, a protect time card in operation 801. For example, the protect time card can be the protect time card illustrated in FIG. 7. In operation 803, the virtual commute experience is launched from the time-aware card. The virtual commute experience can be launched in response to an input from the user selecting the start button 705 of the protect time card. In operation 805, the virtual commute experience is executed. As described herein, the virtual commute experience can include one or more of reviewing tasks and calendar entries from the current workday, previewing tasks and calendar entries for the next workday, reflecting on the current workday, a meditation session to transition from a work mindset to a personal life mindset, and pausing work-related notifications at the conclusion of the virtual commute experience. In operation 807, at the conclusion of the virtual commute experience, the user interface device 110 displays a prompt to set up recurring notifications to start the virtual commute experience. In some examples, operation 807 is similar to operation 605 of FIG. 6, where the user can input a response accepting or declining the prompt to set up recurring notifications and the user interface device 110 stays in a full-screen rest state until the end of the quiet time.

Figure 9:
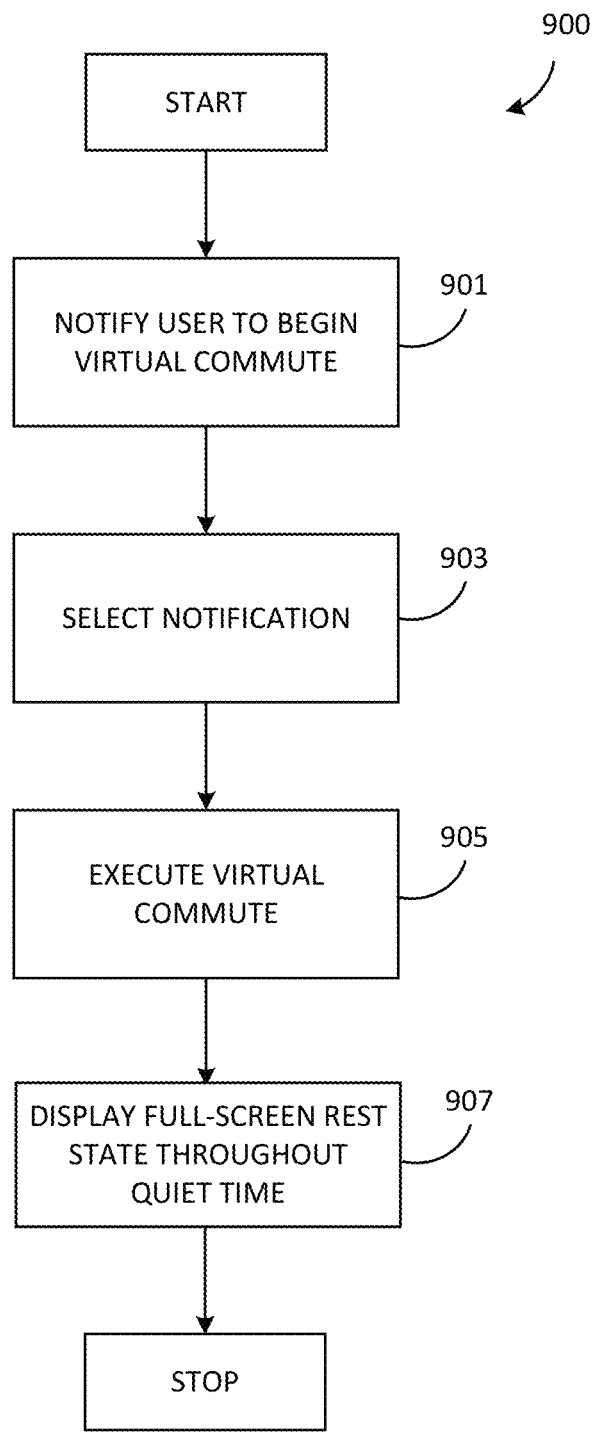
FIG. 9 is a flowchart illustrating operation of a virtual commute experience according to an example.

FIG. 9 is a flowchart illustrating operation of a virtual commute experience according to an example. The flowchart 900 illustrated in FIG. 9 is presented for illustration only and should not be construed as limiting. Other examples of the virtual commute experience can be used without departing from the scope of the present disclosure. The flowchart 900 indicates a method for a virtual commute experience where recurring notifications are set up.

The flowchart 900 depicts a method that begins by notifying, via the user interface device 110, the user to begin the virtual commute experience in operation 901. The notification to begin the virtual commute experience can be a visual notification, such as a pop-up or icon, an audio notification, or both. For example, the protect time card can be the protect time card illustrated in FIG. 7. In operation 903, the notification is selected, such as by an input by the user on the user interface device 110, to begin the virtual commute experience. In operation 905, the virtual commute experience is executed. As described herein, the virtual commute experience can include one or more of reviewing tasks and calendar entries from the current workday, previewing tasks and calendar entries for the next workday, reflecting on the current workday, a meditation session to transition from a work mindset to a personal life mindset, and pausing work-related notifications at the conclusion of the virtual commute experience. In operation 907, at the conclusion of the virtual commute experience, the user interface device 110 displays a full-screen rest state throughout quiet time. As described herein, quiet time is the time following the virtual commute experience where the work-related notifications are paused. In various examples, quiet time continues until the user manually ends quiet time or until the beginning of the next workday.

Figure 10:
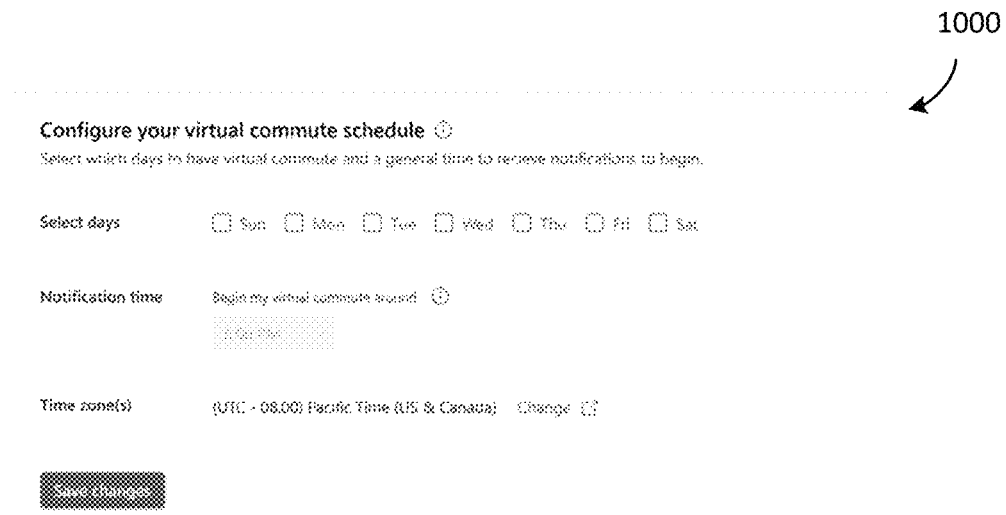
FIG. 10 is a block diagram illustrating a user interface displaying an alert to configure a virtual commute schedule according to an example.

FIG. 10 is a block diagram illustrating a user interface displaying an alert to configure a virtual commute schedule according to an example. The block diagram 1000 illustrated in FIG. 10 is for illustration only. Other examples of a user interface display displaying an alert to configure a virtual commute schedule can be used without departing from the scope of the present disclosure.

As shown in FIG. 10, the virtual commute schedule is customizable for different days and notification times. The alert illustrated in FIG. 10 is displayed via the user interface device 110 and allows the user to select which days to execute the virtual commute experience, a time to be notified to begin the virtual commute experience, and a time zone. The time to be notified to be begin the virtual commute experience can be general, such as a general time for notifications to begin the virtual commute experience, or precise. An example of a general time is "around 5:00 PM", as illustrated in FIG. 10. The general time can be used to build in flexibility, such as to take into account meeting schedules where the user is not be able to begin the virtual commute experience at exactly 5:00 PM. In contrast, an example of a precise time is "at 5:00 PM", where a notification to begin the virtual commute experience is presented at exactly 5:00 PM on the selected day.

FIGS. 11-14 illustrate an example virtual commute experience from a work mindset to a home mindset according to various examples of the present disclosure. The virtual commute experience is executed by the virtual commute component 122 and displayed on the user interface device 110. The virtual commute experience includes a review of the tasks and/or calendar entries from the completed workday, a preview of the tasks and/or calendar entries for the next upcoming workday, a reflection on the completed workday, and a meditation component. Following the conclusion of the virtual commute experience, the notification management component 235 displays a rest state until the beginning of the next workday or, alternatively, until the user manually ends the rest state.

Figure 11:
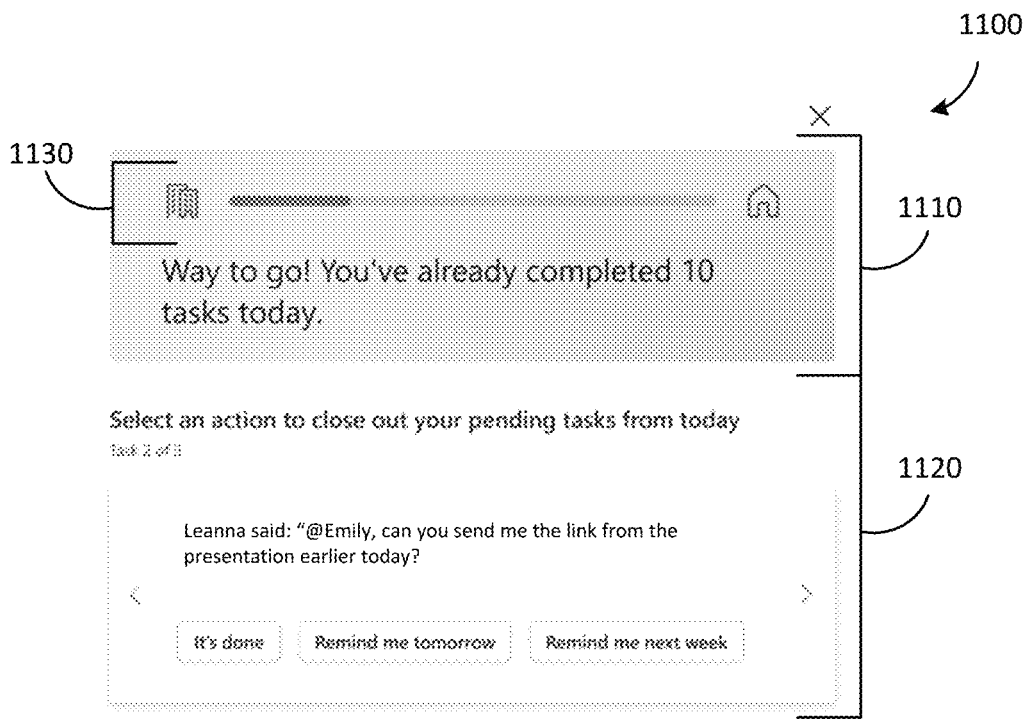
FIG. 11 is a block diagram illustrating a user interface displaying the task triaging component according to an example.

FIG. 11 is a block diagram illustrating a user interface displaying the task triaging component according to an example. The block diagram 1100 illustrated in FIG. 11 is for illustration only. Other examples of a user interface device 110 displaying the task triaging component 114 can be used without departing from the scope of the present disclosure.

As described herein, the task triaging component 114 manages tasks for the user to complete and organizes the tasks into tasks to be completed during a particular day, week, month, quarter, and so forth such that the user can add new tasks, view tasks, update tasks from incomplete to complete, update tasks from complete to incomplete, modify tasks to include additional information, remove tasks, and so forth by accessing the task triaging component 114 via the user interface device 110. The tasks can include various work-related tasks and non-work-related tasks, such as personal tasks. As shown in FIG. 11, the task triaging component 114 includes a status bar 1110 and a task completion component 1120. The status bar 1110 indicates the number of tasks already completed in the workday. The task completion component 1120 enables the user to close out any uncompleted tasks from the workday, if any. For example, as illustrated in FIG. 11, the task triaging component 114 shows three pending tasks to be closed out for the particular workday, and the second of the three pending tasks is to send a link from a presentation earlier in the day to Leanna. The task completion component 1120 includes options to receive an update input, via the user interface device 110, to mark the task as complete, i.e., "It's done", to push the task until the next workday, i.e., "Remind me tomorrow", and to push the task until the next work week, i.e., "Remind me next week". In some examples, the task triaging component 114 can be paused, minimized, and so forth in order for the user to complete a particular task and then resumed to allow the user to select "It's done". The task completion component 1120 further includes options to skip the particular task and move forward to the next task or back to the previous task(s) using the arrows in the task completion component. The task completion component 1120 further includes the option to bypass the task triaging component 114 in the virtual commute experience by selecting "Next", which causes the virtual commute component 122 to move forward in the virtual commute experience without closing out the tasks.

As shown herein, the task triaging component 114 identifies at least one to-do task for the current day and displays the at least one to-do task via the user interface device 110. In various examples, a task can be a task specified by the user, such as a task the user manually added to the to-do list, or a task the task triaging component identified as a potential task based on data 128 and/or historical data 130 stored in the data storage device 126 or in communications received from the communications interface device 112. For example, as shown in FIG. 11, the task triaging component 114 identifies a potential task based on a message received from "Leanna". The message can be received via any platform monitored by the task triaging component 114, such as electronic mail, i.e., email, an intraorganizational message platform, e.g., Microsoft Teams®, Slack®, and RingCentral®, a work-related social media platform, and so forth, to identify potential tasks for the user to increase productivity.

Accordingly, the task triaging component 114 provides task generation services by parsing messages from internal or external messaging services to automatically identify tasks and present the identified tasks to the user at the conclusion of the workday. As such, the task triaging component 114 not only provides a mechanism for the user to check off completed tasks but presents an opportunity for the user to review and reflect on the tasks from the current workday and plan the next workday by previewing upcoming tasks and providing an opportunity to schedule reminders for new tasks in a calming environment as the user progresses through the virtual commute experience to conclude their workday.

In some examples, the task triaging component 114 includes an option to surface and address some or all un-checked tasks, i.e., tasks that are marked as incomplete, directly from the virtual commute experience. In other words, data regarding an unchecked task in an external application can be extracted from the external application, displayed on the user interface device 110 via the task triaging component 114, the virtual commute experience can generate a prompt to address the un-checked task, and receive an input that is used to update the data in the external application. In other words, the virtual commute component 122 includes integration functionality to store response inputs in other, external applications.

In some examples, the task triaging component 114 can display, via the user interface device 110, an alert that identifies a potential to-do task for the next workday. For example, a potential to-do task can be identified from an external application, such as an email application, messaging application, calendar application, and so forth. As described herein, the task triaging component 114 can identify the potential to-do task from one or more external applications, present the alert identifying the potential to-do task, and generate a prompt for a response input in response to the alert that can accept the new task or deny the new task. A response input accepting the new task accesses the external task application to add the identified new task to the to-do task list. A response input denying the new task does not add the identified new task to the to-do task list.

In some examples, the task triaging component 114 includes the option to view tasks other than the tasks for the immediately next workday. For example, the task triaging component 114 can include additional options to view tasks for the rest of the workweek, tasks for the next month, previous tasks, and so forth.

As shown in FIG. 11, throughout the virtual commute experience a virtual commute status bar 1130 is displayed. The virtual commute status bar 1130 indicates the progress of the user through the virtual commute experience from a work mindset, illustrated by a work icon, to a personal mindset, illustrated by a home icon. The virtual commute status bar 1130 can illustrate a percentage of the virtual commute experience that been completed. In the example illustrated in FIG. 11, the task triaging component 114 is the first step of the virtual commute experience and, as such, the virtual commute status bar 1130 indicates a relatively small portion of the virtual commute experience has been completed.

Figure 12:
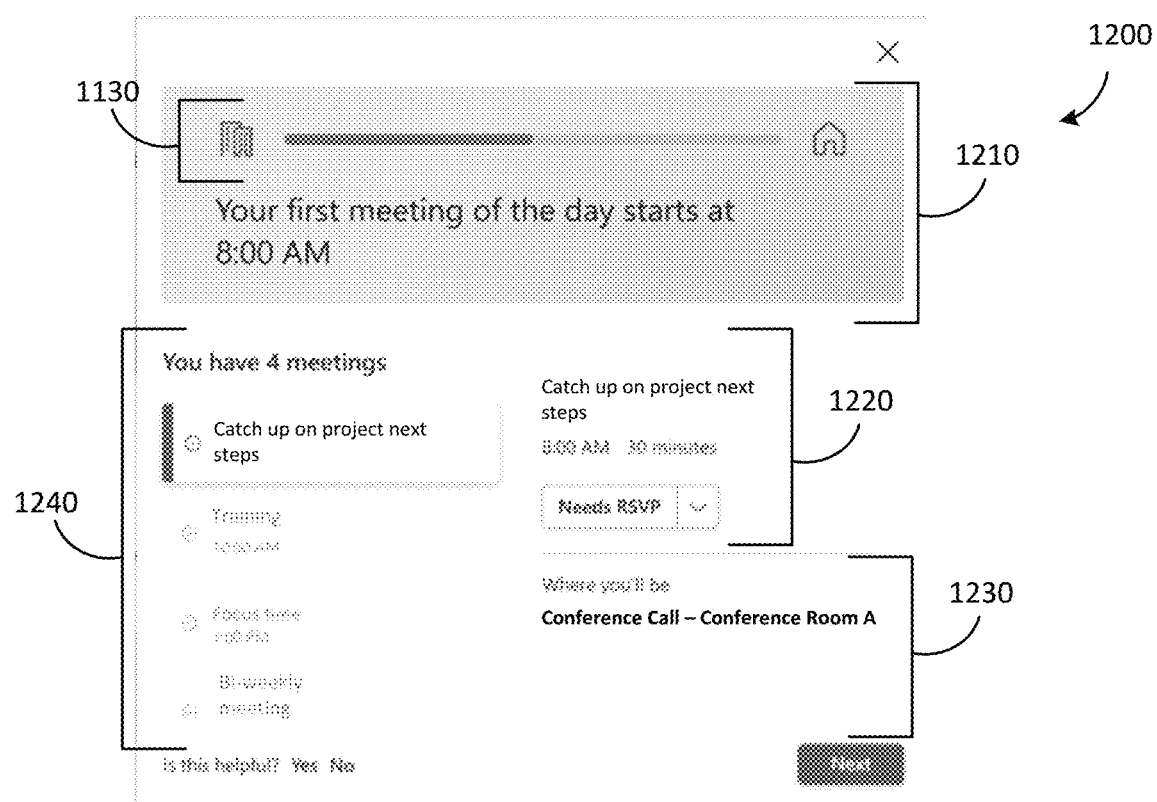
FIG. 12 is a block diagram illustrating a user interface displaying calendar data according to an example.

FIG. 12 is a block diagram illustrating a user interface displaying the calendar component according to an example. The block diagram 1200 illustrated in FIG. 12 is for illustration only. Other examples of a user interface device 110 displaying the calendar component 116 can be used without departing from the scope of the present disclosure.

As described herein, the calendar component 116 manages events on a calendar for the user and organizes the events into time- and date-based events. The events can include various work-related events and non-work-related events, such as personal events. As shown in FIG. 12, the calendar component 116 includes a status bar 1210, an RSVP component 1220, a location identification component 1230, and an overview component 1240. The status bar 1210 the first event or entry scheduled on the next workday. For example, as shown in FIG. 12, the status bar 1210 indicates the first meeting of the next workday is scheduled for 8:00 AM. In examples where the next workday does not include scheduled calendar entries, the status bar 1210 can indicate no events are scheduled for the next workday, can indicate the next event scheduled and the workday on which the next event is scheduled, and so forth. The RSVP component 1220 provides the RSVP status of the next meeting identified in the status bar 1210. For example, the next meeting identified in the status bar 1210 is "Catch up on project next steps", is scheduled for 30 minutes beginning at 8:00 AM, and the RSVP status is "Needs RSVP". Other RSVP options can include, but are not limited to, "Accepted", "Declined", "Tentatively Accepted", "Tentatively Declined", and so forth. The location identification component 1230 identifies the location of the event identified in the status bar 1210. For example, the location identification component 1230 identifies the meeting "Catch up on project next steps" is a "Conference Call" and the location is "Conference Room A". The overview component 1240 illustrates an overview of some or all of the events on the calendar scheduled for the next workday in an ordered arrangement. The overview component 1240 identifies that the user has four events scheduled for the next workday and presents the four meetings in chronological order. For example, as shown in FIG. 12, the overview component 1240 illustrates the events scheduled for the next workday in order with the first event of the day first, the second event of the day second, and so forth. The overview component 1240 allows each event to be selected, via the user interface device 110, to update the information displayed in the RSVP component 1220 and the location identification component 1230 for each particular event. For example, the user can select the second meeting of the day, "Training" at 10:00 AM to cause the RSVP component 1220 to be updated to show the time, duration, and RSVP status of "Training" and to cause the location identification component 1230 to be updated to show the location of "Training". The calendar component 116 further includes the option to bypass the calendar component 116 in the virtual commute experience by selecting "Next", which causes the virtual commute component 122 to move forward in the virtual commute experience without further management of the calendar entries for the next workday.

In some examples, the calendar component 116 includes an option to surface and address some or all unresolved calendar entries, i.e., calendar entries that have not been RSVPed to, directly from the virtual commute experience. In other words, data regarding an unresolved calendar entry in an external application can be extracted from the external application, displayed on the user interface device 110 via the calendar component 116, the virtual commute experience can generate a prompt to address the unresolved calendar entry, and receive an input that is used to update the data in the external application. In other words, the virtual commute component 122 includes integration functionality to store response inputs in other, external applications, such as a calendar application.

In some examples, the calendar component 116 includes the option to view calendar entries other than the calendar entries for the immediately next workday. For example, the calendar component 116 can include additional options to view calendar entries for the rest of the workweek, calendar entries for the next month, previous calendar entries, and so forth.

As illustrated in FIG. 12, the calendar component 116 is the second step of the virtual commute experience and, as such, the virtual commute status bar 1130 indicates a greater portion of the virtual commute experience has been completed than was illustrated in FIG. 12.

Figure 13:
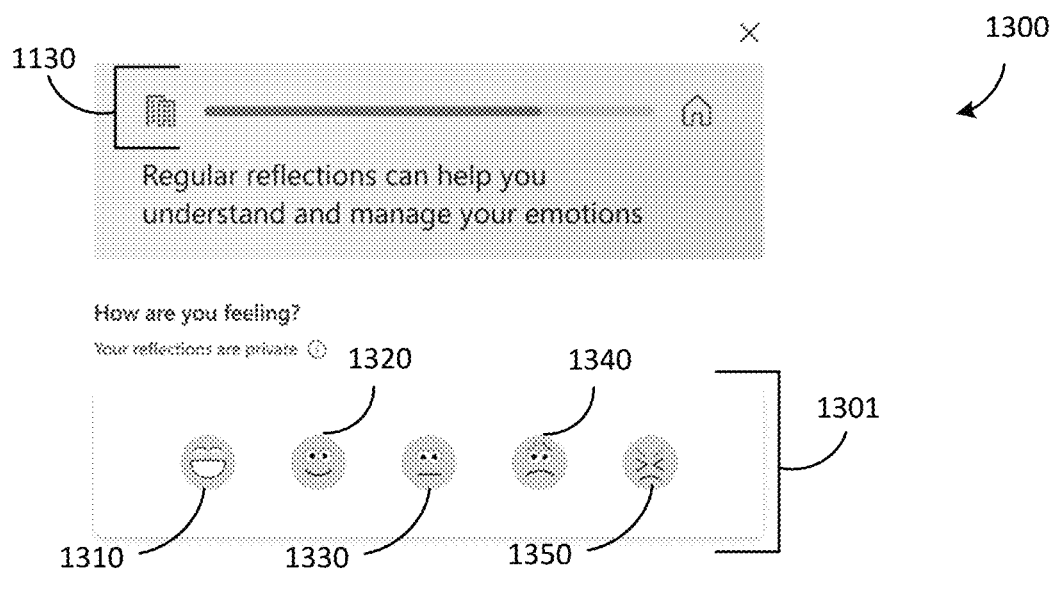
FIG. 13 is a block diagram illustrating a user interface displaying a reflection component according to an example.

FIG. 13 is a block diagram illustrating a user interface displaying a reflection component according to an example. The block diagram 1300 illustrated in FIG. 13 is for illustration only. Other examples of a user interface device 110 displaying the reflection component 118 can be used without departing from the scope of the present disclosure.

As described herein, the reflection component 118 manages reflections of the user such as by prompting the user to reflect on the workday by including a question associated with the emotional well-being of the user. The prompt can include at least one emotional state depiction, such as, but not limited to, a set of emotional state depictions 1301. In some examples, the emotional state depictions are emotion indicators that include a set of five emojis representing five predefined emotion states from which a user can choose. In this example, a first emoji 1310 represents a great, fantastic, or happy state. A second emoji 1320 represents a pleasant or content state. A third emoji 1330 represents a neutral emotional state. A fourth emoji 1340 represents a sad or slightly negative emotional state. The fifth emoji 1350 represents a very sad, angry, or very negative emotional state. In this example, the set of emotional state depictions shows five emojis which the user can select to add their response in order from the best mood to the worst mood, reading left to right. The worst to best mood mapped on a scale of negative two to positive two (−2->+2).

Emojis are effective emotion indicators because emojis are globally and consistently applicable in representation of the emotions a user might want to journal. Each emoji represents a different mood or emotional state. For example, a smiling emoji is selected by a user to indicate the user's current emotional state is happy, content, or pleasant. A frowning emoji is selected to indicate the current emotional state is sad, discontent, or unpleasant. Emojis may be utilized to represent a wide variety of emotions, moods and/or conditions, such as, but not limited to, anger, laughter, happiness, excitement, surprise, sleepiness, confusion, sadness, neutral emotions, or any other state. In the example shown in FIG. 13, the set of emotional state depictions includes five emojis. However, the examples are not limited to the five emojis shown. The set of emotional state depictions can include as few as two indicators, indicating a positive state or a negative emotional state. In yet other examples, the set of emotional state depictions includes three or more indicators. For example, the set of emotional state depictions can include four emojis, six emojis or any other number of emojis indicating possible emotional states. In the example shown in FIG. 13, all the emotional state depictions in the set of emotional state depictions are emojis. However, the examples are not limited to using emojis as emotional state depictions. In other examples, the indicators are implemented as text indicators, letter indicators, number indicators, scales, ratings, percentages, symbol indicators, color indicators, or any other type of indicators. For example, an emotional state depiction can be a red indicator for a negative emotional state, a green indicator for a positive emotional state and a yellow indicator for a neutral emotional state. In another example, a letter H may be used for a happy emotional state, a letter N for a neutral emotional state and a letter S for a sad emotional state. Any other type of indicators may be used.

In the example shown in FIG. 13, the set of emotional indicators includes five specific emojis representing five emotional states. However, the examples are not limited to the five specific emojis shown in FIG. 13. In other examples, the emotional indicator emojis have different shapes or appearance than that shown in FIG. 13. In still other examples, the emojis are user configurable. In these examples, the user can customize which emojis are presented to the user within the set of emotional response indicators. Thus, if a user does not like a default emoji displayed with the recurring reminder prompt, the user can select a different emoji or other indicator to be displayed in place of the default emoji.

The first time the reflection component 118 is displayed to the user, a pre-load privacy teach can be banner is displayed. The privacy teach banner includes a privacy notice and disclaimer regarding the fact that all information and emotion responses entered by the user into the reflection component 118 is private and not shared with any other users.

As illustrated in FIG. 13, the reflection component 118 is the third step of the virtual commute experience and, as such, the virtual commute status bar 1130 indicates a greater portion of the virtual commute experience has been completed than was illustrated in FIGS. 11 and 12.

Figure 14:
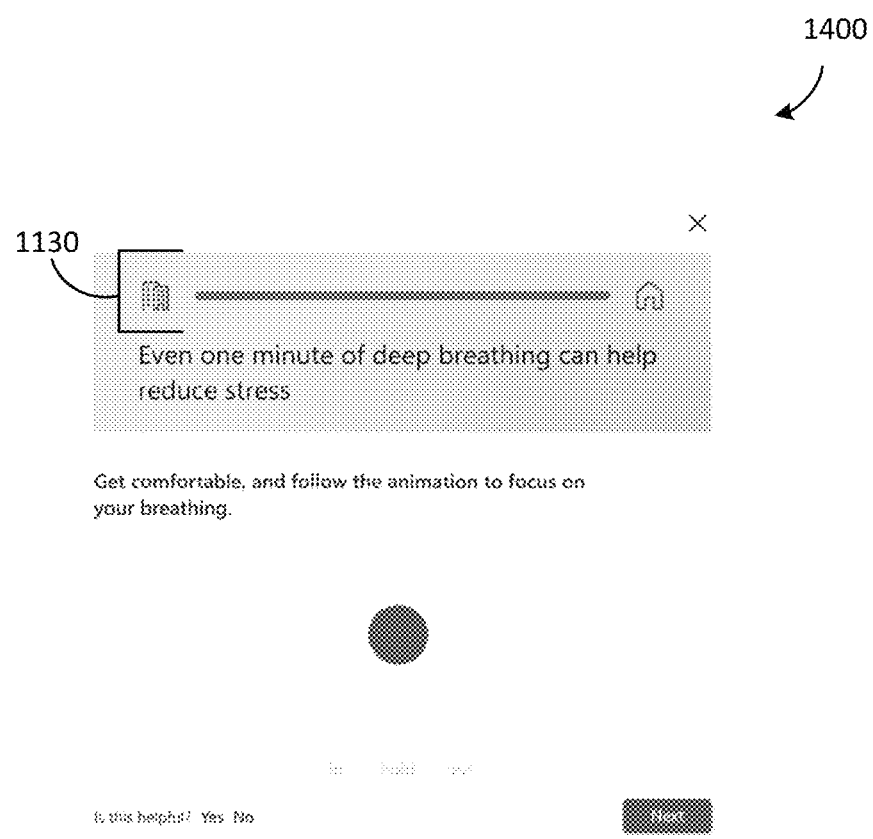
FIG. 14 is a block diagram illustrating a user interface displaying a meditation component according to an example.

FIG. 14 is a block diagram illustrating a user interface displaying a meditation component according to an example. The block diagram 1400 illustrated in FIG. 14 is for illustration only. Other examples of a user interface device 110 displaying the meditation component 124 can be used without departing from the scope of the present disclosure.

As described herein, the meditation component 124 can include various images, animations, gifs, text, and so forth used to more effectively transition the user from a work mindset to a personal mindset, in the case of a virtual commute experience from work to home, or from a personal mindset to a work mindset, in the case of a virtual commute experience from home to work. For example, the meditation component 124 illustrated in FIG. 14 includes an animation to focus the user on their breathing. The animation includes prompts to breathe in, hold the breath, and breathe out with an accompanying animation that together help to relax the user and assist with the transition from a work mindset to a personal mindset or from a personal mindset to a work mindset.

In some examples, a particular meditation application or session executed by the meditation component 124 is selected based on the received reflection input. For example, where the reflection input indicates a negative emotion, an uplifting meditation session can be selected in an attempt to improve the spirits of the user. Where the reflection input indicates a positive emotion, a meditation session can be selected in order to focus the user on the positive workday.

In some examples, the meditation component 124 further includes a feedback loop to measure the effectiveness of the selected meditation session. For example, following the conclusion of the meditation session, the user interface device 110 can display a message requesting a feedback input regarding the meditation session. The feedback input can be used to continually improve the selected meditation sessions, such as suggesting meditation sessions the user provides positive feedback for more often and suggesting meditation sessions the user provides negative feedback for less often or not at all.

In some examples, following the conclusion of the meditation provided by the meditation component 124, the virtual commute experience concludes. At the conclusion of the virtual commute experience, the computing device 102 enters a rest state that pauses, or blocks, notifications until the beginning of the next workday or, alternatively, until the rest state is manually concluded.

As illustrated in FIG. 14, the meditation component is the fourth and final step of the virtual commute experience and, as such, the virtual commute status bar 1130 indicates the virtual commute experience has been completed. For example, the entire virtual commute status bar 1130 has been filled in toward the home icon, indicating the user has completed the virtual commute experience to transition from the work mindset to the personal mindset.

Various examples of the present disclosure provide a virtual commute experience that transitions the user from a home mindset to a work mindset, for example at the beginning of a workday. In these examples, the virtual commute experience enables the user to prepare for the upcoming workday by reviewing tasks and/or calendar entries from the previous workday, previewing tasks and/or calendar entries for the upcoming workday, providing a baseline reflection on the user's emotional state prior to completing the workday, and providing a meditation session to ease the user's mindset from personal to work. The virtual commute experience from home to work further disables the blocking, or pausing, of notifications to the computing device 102 that was enabled at the conclusion of the previous virtual commute experience from the work mindset to the home mindset.

Figure 15:
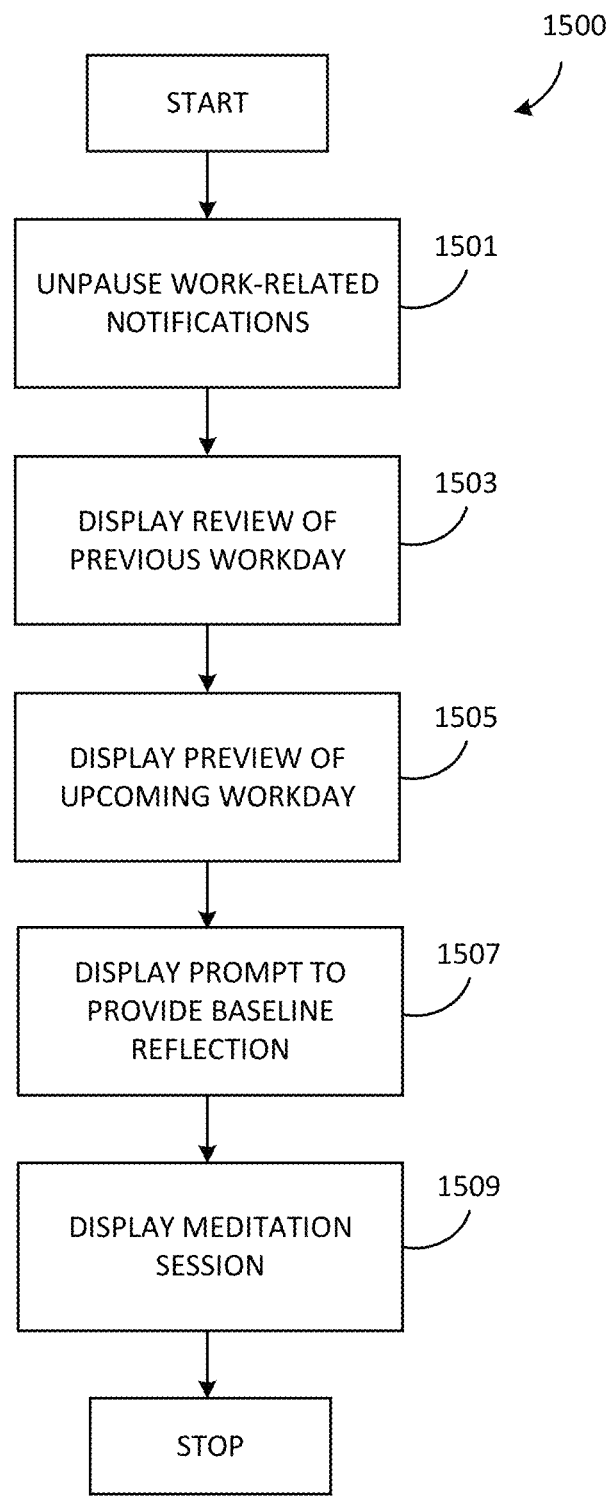
FIG. 15 is a flowchart illustrating a computerized method of a virtual commute experience according to an example.

For example, FIG. 15 is a flowchart illustrating a computerized method of a virtual commute experience according to an example. The flowchart 1500 illustrated in FIG. 15 is presented for illustration only and should not be construed as limiting. Other examples of the computerized method of the virtual commute experience can be used without departing from the scope of the present disclosure. The computerized method can be implemented by one or more electronic devices described herein, such as the computing device 102.

The flowchart 1500 depicts a method that begins by the virtual commute component 122 unpausing, or blocking, the work-related notifications on the user interface device 110 that were paused, or blocked, at the conclusion of the previous virtual commute experience in operation 1501. As described herein, for example in operation 907 of FIG. 9, at the conclusion of the virtual commute experience from a work mindset to a personal mindset, the user interface device 110 displays a full-screen rest state throughout quiet time. Quiet time is the time following the virtual commute experience where the work-related notifications are paused. Operation 1501 can be performed at a particular time, such as a recurring time the user begins their workday, or can be performed manually, such as when the user begins a new workday.

In operation 1503, the virtual commute component 122 controls the user interface device 110 to display a review of the previous workday. The review of the previous workday can include one or both of a review of tasks from the previous workday, implemented by the task triaging component 114, and a review of calendar entries from the previous workday, implemented by the calendar component 116. In the review of the previous workday, the virtual commute component 122 controls the user interface device 110 to display a summary of completed tasks and calendar entries from the previous workday.

In operation 1505, the virtual commute component 122 controls the user interface device 110 to display a preview of the upcoming workday. The preview of the upcoming workday can include one or both of a preview of tasks for the upcoming workday, implemented by the task triaging component 114, and a preview of calendar entries for the upcoming workday, implemented by the calendar component 116. In the preview of the upcoming workday, the virtual commute component 122 controls the user interface device 110 to display a summary of tasks to be completed during the upcoming workday and calendar entries for the upcoming workday. In some examples, the preview of the upcoming workday can further include prompts for the user to add new tasks to be completed, move tasks to be completed to a different day or week, add new calendar entries, move tasks for upcoming calendar entries to a different day or week, provide RSVPs for calendar entries that have not received an RSVP, and so forth. In some examples, the preview of the upcoming workday suggests a time or times during the upcoming workday to schedule focus time. In some examples, the preview of the upcoming workday includes an option to set goals for the upcoming workday. The goals for the upcoming workday can then be reviewed at the end of the workday in the virtual commute experience from work to home, such as in the review of the previous workday as described herein.

In operation 1507, the virtual commute component 122 controls the user interface device 110 to display a prompt for the user to provide, or input, a baseline reflection. The prompt can include a prompt to input or select at least one emotional state depiction, such as, but not limited to, a set of emotional state depictions such as the set of emotional state depictions 1301. For example, the user can provide an input to the user interface device 110 selecting an emotional state. The selected emotional state can be stored as data 128 in the data storage device 126. During the virtual commute experience at the end of the workday, the emotional state selected during the virtual commute experience at the beginning of the workday can be compared to the emotional state selected during the virtual commute experience at the end of the workday and then used to identify how to better improve the user's emotional state throughout the workday. For example, the virtual commute component 122 can begin to identify, via the machine learning model 120, tasks or meetings that improve the emotional state of the user and provide suggestions to work those tasks or meetings into the workday or, conversely, identify, via the machine learning model 120, tasks or meeting that harm the emotional state of the user and provide suggestions to minimize those tasks or meetings during the workday.

In operation 1509, the virtual commute component 122 controls the user interface device 110 to display a meditation session, such as via the meditation component 124. The meditation session can include various images, animations, gifs, text, and so forth used to more effectively transition the user from a personal mindset to a work mindset. In various examples, the meditation session can include one or more of meditation exercises, breathing exercises, and so forth that are designed to calm a user and ease the mindset transition.

Figure 16:
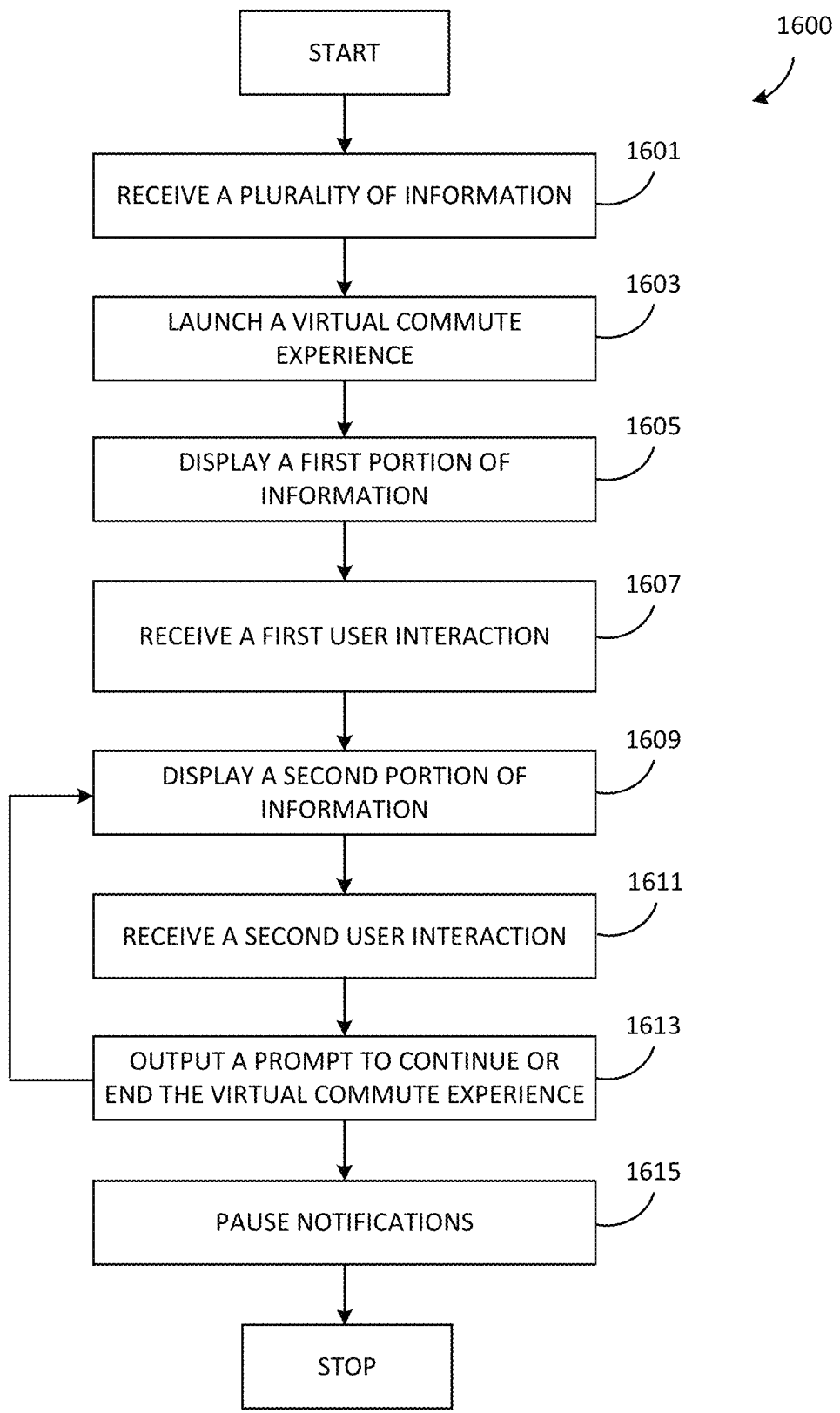
FIG. 16 is a flowchart illustrating a computerized method of a virtual commute experience according to an example.

FIG. 16 is a flowchart illustrating a computerized method of a virtual commute experience according to an example. The flowchart 1600 illustrated in FIG. 16 is presented for illustration only and should not be construed as limiting. Other examples of the computerized method of the virtual commute experience can be used without departing from the scope of the present disclosure. The computerized method can be implemented by one or more electronic devices described herein, such as the computing device 102.

The flowchart 1600 depicts a method that begins by the virtual commute component 122 receiving a plurality of information from one or more different programs at operation 1601. The plurality of information includes one or more data formats. For example, the one or more different programs can be selected from programs corresponding to one or more of the task triaging component 114, the calendar component 116, the reflection component 118, and the meditation component 124. For example, a task program or application can be associated with the task triaging component 114 and the virtual commute component 122 can receive task information from the task program that includes at least one to-do task from the current workday or the next workday. As another example, a calendar program or application can be associated with the calendar component 116 and the virtual commute component 122 can receive calendar information from the calendar program that includes at least one calendar entry from the current workday or the next workday.

In operation 1603, the virtual commute component 122 launches a virtual commute experience in response via a user interface, such as the user interface device 110, in response to a trigger event. In some examples, the virtual commute experience is launched at recurring times each day and the trigger event is a particular time of day. For example, the virtual commute experience can be launched at the same time each workday, can be launched at configurable times on particular days, and so forth. In some examples, the virtual commute experience is launched manually, and the trigger event is a user controlling the virtual commute component 122 to launch the virtual commute experience. In some examples, the trigger event is a particular event occurring, such as the conclusion of the final meeting of a workday, and the virtual commute experience is launched based on the final meeting of the workday concluding. In some examples, the virtual commute experience is launched dynamically by a machine learning model, such as the machine learning model 120, based on historical data that includes at least one previous time of day at which the virtual commute experience was launched on the user interface device 110.

In operation 1605, in response to the virtual commute experience being launched, the virtual commute component 122 displays a first portion of the plurality of information from the one or more different programs. The first portion includes a first data format. For example, the first portion of the plurality of information can be a particular task, a particular calendar entry, and so forth from one of the external applications accessed by the task triaging component 114, the calendar component 116, and so forth. In some examples, the first portion of information is at least one task that was identified as to-do during the workday.

In operation 1607, the virtual commute component 122 receives a first user interaction. The first user interaction can be an input from a user that is received via the user interface device 110. For example, the first user interaction may be an input that responds to the at least one task identified as to-do during the workday. For a task that is identified as complete, the first user interaction can be an input acknowledging or confirming the task as correctly identified. For a task that is identified as incomplete, the first user interaction can be an update or status change input that changes the status of the task from incomplete to complete if the task was completed or a reminder input requesting a reminder at a later time to complete the task if the task was not completed. The received first user interaction updates the external application corresponding to the displayed portion of data from the virtual commute experience without exiting the virtual commute experience and navigating directly to the external application.

In operation 1609, the virtual commute component 122 displays, on the user interface device 110, a second portion of the plurality of information from the one or more programs. The second portion of the plurality of information includes a second data format that is different than the first data format. For example, the second portion of the plurality of information can be a particular task, a particular calendar entry, and so forth from one of the external applications accessed by the task triaging component 114, the calendar component 116, and so forth. In some examples, the second portion of information is at least one calendar entry that is scheduled for the next workday for which an RSVP has not been received.

In operation 1611, the virtual commute component 122 receives a second user interaction. The second user interaction can be an input from a user that is received via the user interface device 110. In some examples, the second user interaction is different than the first user interaction. For example, the second user interaction may be an input that responds to the at least one calendar entry, such as inputting an RSVP to the calendar entry. The received second user interaction updates the external application corresponding to the displayed portion of data from the virtual commute experience without exiting the virtual commute experience and navigating directly to the external application.

In operation 1613, the virtual commute component 122 outputs, via the user interface device 110, a prompt for the user to select to either continue the virtual commute experience or end the virtual commute experience. In response to the prompt, the virtual commute component 122 identifies the selection response. In examples where the response selects to end the virtual commute experience, the virtual commute experience proceeds to operation 1615. In examples where the response selects to continue the virtual commute experience, the virtual commute experience continues and presents an additional portion of information as in operation 1609. The virtual commute experience then receives another user interaction as in operation 1611 and then again presents the prompt for the user to select to either continue the virtual commute experience or end the virtual commute experience. In some examples, the prompt is displayed via the user interface device 110 for a predetermined amount of time to receive the response to the prompt. A predetermined response can be used based on the predetermined amount of time expiring without receiving a response. For example, the predetermined response can be to end the virtual commute experience. In another example, the predetermined response can be to continue the virtual commute experience.

In operation 1615, in response to the conclusion of the virtual commute experience, the virtual commute component 122 enters quiet time and pauses work-related notifications. In some examples, the conclusion of the virtual commute experience concludes the transition from a work mindset to a personal life mindset. Accordingly, the virtual commute component 122 pauses, or blocks, notifications until the beginning of the next workday or, alternatively, until an override is executed to un-pause the notifications. Work-related notifications can be identified according to various examples as described herein. For example, notifications can be identified as work-related automatically, such as based on the organizational email address, or based the user manually selecting notifications from particular individuals or organizations as work-related.

Additional aspects and examples disclosed herein are directed to a system, method and/or one or more computer storage devices having computer-executable instructions stored thereon for providing a virtual commute experience which, on execution by a computer, cause the computer to perform operations comprising: receiving a plurality of information from one or more different programs, the plurality of information having one or more data formats, in response to a trigger event, launching a virtual commute experience via the user interface, in response to the launch of the virtual commute experience, displaying, on the user interface, a first portion of the plurality of information from the one or more different programs, the first portion having a first data format, receiving a first user interaction to the first portion of the plurality of information, in response to receiving the first user interaction, displaying a second portion of the plurality of information, the second portion having a second data format different from the first data format, receiving a second user interaction to the second portion of the plurality of information, outputting a prompt to continue or end the virtual commute experience, and in response to receiving a response to the prompt to end the virtual commute experience, pausing notifications generated by one or more different programs via the user interface until another trigger event.

Some examples provide that the first user interaction updates the first portion of the plurality of information at the respective program of the one or more programs and the second user interaction updates the second portion of the plurality of information at the respective program of the one or more programs.

Some examples provide that in response to receiving a response to the prompt to continue the virtual commute experience, display a third portion of the plurality of information, the third portion having a third data format different from the first data format and the second data format.

Some examples provide that the one or more different programs comprise one or more of a task triaging program, a calendar program, an emotional wellbeing program, and a meditation program. Some examples provide that the plurality of information includes at least one of task data, calendar data, emotional state data, or meditation data.

Some examples provide a machine learning (ML) model configured to dynamically launch the virtual commute experience based on historical data, the historical data comprising at least one previous time of day at which the processor launched the virtual commute on the user interface device.

Some examples provide a notification identification feature to accurately identify the notifications to be paused at the conclusion of the virtual commute experience. In response to identifying the notification as work-related, the notification is paused. In response to not identifying the notification as work-related, the notification is not paused.

Alternatively, or in addition to the other examples described herein, examples include any combination of the following:
  receiving a plurality of information from one or more different programs, the plurality of information having one or more data formats;
  in response to a trigger event, launching a virtual commute experience via the user interface;
  in response to the launch of the virtual commute experience, displaying, on the user interface, a first portion of the plurality of information from the one or more different programs, the first portion having a first data format;
  receiving a first user interaction to the first portion of the plurality of information;
  in response to receiving the first user interaction, displaying a second portion of the plurality of information, the second portion having a second data format different from the first data format;
  receiving a second user interaction to the second portion of the plurality of information;
  outputting a prompt to continue or end the virtual commute experience;
  in response to receiving a response to the prompt to end the virtual commute experience, pausing notifications generated by one or more different programs via the user interface until another trigger event;
  the first user interaction updates the first portion of the plurality of information at the respective program of the one or more programs;
  the second user interaction updates the second portion of the plurality of information at the respective program of the one or more programs;
  in response to receiving a response to the prompt to continue the virtual commute experience, display a third portion of the plurality of information, the third portion having a third data format different from the first data format and the second data format;
  the one or more different programs comprise one or more of a task triaging program, a calendar program, an emotional wellbeing program, and a meditation program;
  the plurality of information includes at least one of task data, calendar data, emotional state data, or meditation data;
  a machine learning (ML) model configured to dynamically launch the virtual commute experience based on historical data, the historical data comprising at least one previous time of day at which the processor launched the virtual commute on the user interface device;
  in response to identifying the notification as work-related, pause the notification, and;
  in response to not identifying the notification as work-related, not pause the notification.

Exemplary Operating Environment

Figure 17:
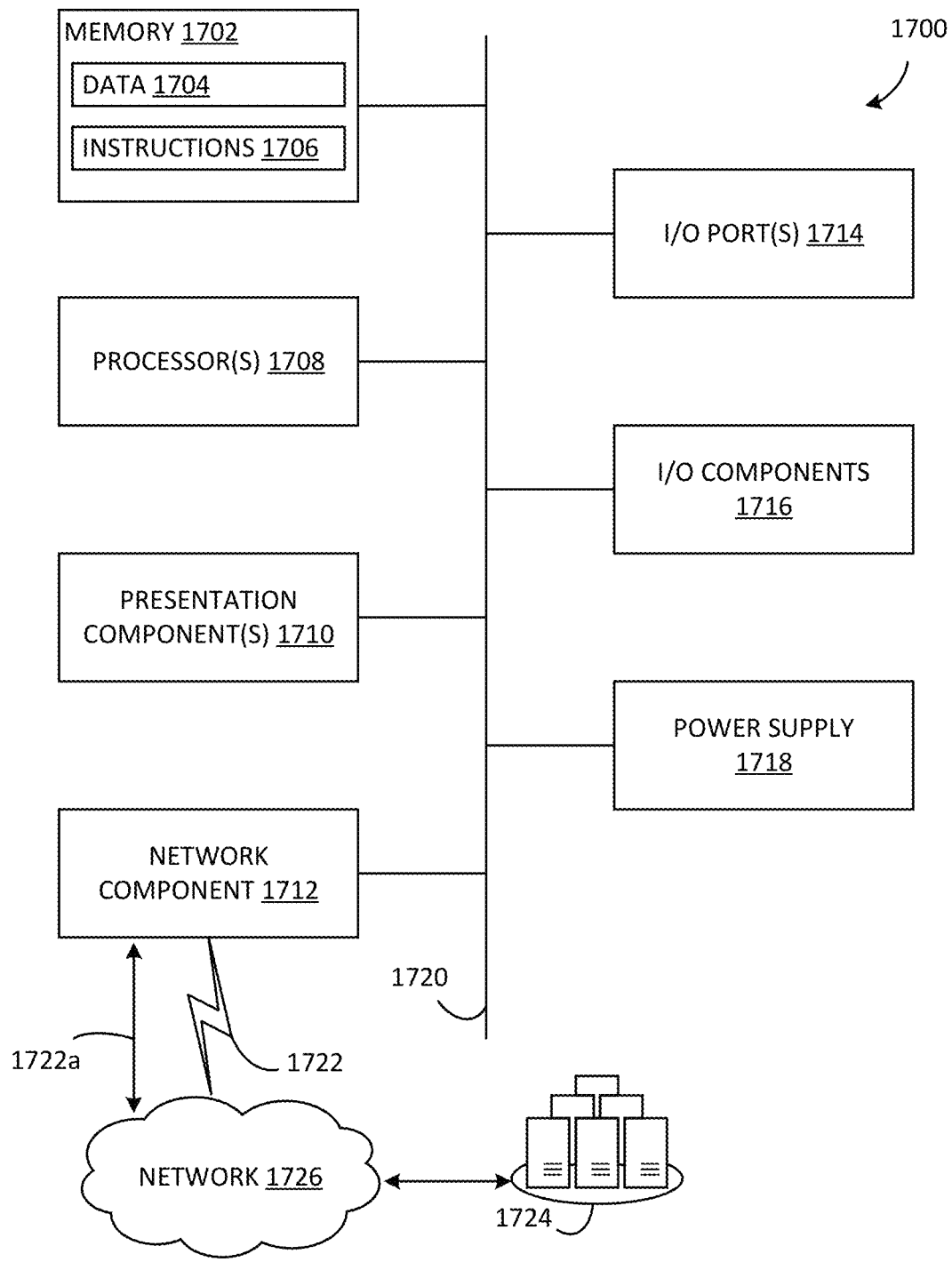
FIG. 17 is a block diagram illustrating an example computing environment suitable for implementing one or more of the various examples disclosed herein.

FIG. 17 is a block diagram of an example computing device 1700 for implementing aspects disclosed herein and is designated generally as computing device 1700. Computing device 1700 is an example of a suitable computing environment and is not intended to suggest any limitation as to the scope of use or functionality of the examples disclosed herein. Neither should computing device 1700 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1700 includes a bus 1720 that directly or indirectly couples the following devices: computer-storage memory 1702, one or more processors 1708, one or more presentation components 1710, I/O ports 1714, I/O components 1716, a power supply 1718, and a network component 1712. While computing device 1700 is depicted as a seemingly single device, multiple computing devices 1700 may work together and share the depicted device resources. For example, memory 1702 may be distributed across multiple devices, and processor(s) 1708 may be housed with different devices.

Bus 1720 represents what may be one or more busses (such as an address bus, data bus, or a combination thereof). Although the various blocks of FIG. 17 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 17 and the references herein to a "computing device." Memory 1702 may take the form of the computer-storage media references below and operatively provide storage of computer-readable instructions, data structures, program modules and other data for computing device 1700. In some examples, memory 1702 stores one or more of an operating system, a universal application platform, or other program modules and program data. Memory 1702 is thus able to store and access data 1704 and instructions 1706 that are executable by processor 1708 and configured to carry out the various operations disclosed herein.

In some examples, memory 1702 includes computer-storage media in the form of volatile and/or nonvolatile memory, removable or non-removable memory, data disks in virtual environments, or a combination thereof. Memory 1702 may include any quantity of memory associated with or accessible by computing device 1700. Memory 1702 may be internal to computing device 1700 (as shown in FIG. 17), external to computing device 1700, or both. Examples of memory 1702 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1700. Additionally, or alternatively, memory 1702 may be distributed across multiple computing devices 1700, for example, in a virtualized environment in which instruction processing is carried out on multiple computing devices 1700. For the purposes of this disclosure, "computer storage media," "computer-storage memory," "memory," and "memory devices" are synonymous terms for computer-storage memory 1702, and none of these terms include carrier waves or propagating signaling.

Processor(s) 1708 may include any quantity of processing units that read data from various entities, such as memory 1702 or I/O components 1716 and may include CPUs and/or GPUs. Specifically, processor(s) 1708 are programmed to execute computer-executable instructions for implementing aspects of the disclosure. The instructions may be performed by the processor, by multiple processors within computing device 1700, or by a processor external to client computing device 1700. In some examples, processor(s) 1708 are programmed to execute instructions such as those illustrated in the in the accompanying drawings. Moreover, in some examples, processor(s) 1708 represent an implementation of analog techniques to perform the operations described herein. For example, the operations may be performed by an analog client computing device 1700 and/or a digital client computing device 1700. Presentation component(s) 1710 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1700, across a wired connection, or in other ways. I/O ports 1714 allow computing device 1700 to be logically coupled to other devices including I/O components 1716, some of which may be built in. Example I/O components 1716 include, for example but without limitation, a microphone, joystick, game pad, satellite dish, scanner, printer, wireless device, etc.

Computing device 1700 may operate in a networked environment via network component 1712 using logical connections to one or more remote computers. In some examples, network component 1712 includes a network interface card and/or computer-executable instructions (e.g., a driver) for operating the network interface card. Communication between computing device 1700 and other devices may occur using any protocol or mechanism over any wired or wireless connection. In some examples, network component 1712 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1712 communicates over wireless communication link 1722 and/or a wired communication link 1722a to a cloud resource 1724 across network 1726. Various different examples of communication links 1722 and 1722a include a wireless connection, a wired connection, and/or a dedicated link, and in some examples, at least a portion is routed through the internet.

Although described in connection with an example computing device 1700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A system, comprising:
   a user interface;
   a processor communicatively coupled to the user interface; and
   a computer-readable medium storing instructions that are operative, upon execution by the processor, to cause the processor to:
   extract a plurality of information from a plurality of external applications, the plurality of information having one or more data formats, without separately opening the plurality of external applications;

in response to a trigger event, dynamically launch, by a machine learning (ML) model implemented on the processor, a virtual commute experience via the user interface, wherein the virtual commute experience is an application that, when executed, includes:

in response to the launch of the virtual commute experience, on the user interface, displaying, via a first component of a plurality of components, a first portion of the plurality of information extracted from the plurality of external applications, the first portion having a first data format;

receiving a first user interaction to the first portion of the plurality of information;

in response to receiving the first user interaction:
updating, at the first component, a first entry associated with the first portion based on the first user interaction;

analyzing the first user interaction to generate a second entry for a second component of the plurality of components, wherein the second component is different from the first component;

adding the second entry to the second component;

updating data in the plurality of external applications based on the first user interaction without separately opening each of the plurality of external applications; and displaying a second portion of the plurality of information, the second portion having a second data format different from the first data format;

receiving a second user interaction to the second portion of the plurality of information;

outputting a prompt to continue or end the virtual commute experience; and in response to receiving a response to the prompt to end the virtual commute experience, pausing notifications generated by the plurality of external applications via the user interface until another trigger event, presenting an interactive summary of events of a workday during which the virtual commute experience is executed, and providing a visual celebration associated with the events of the workday.

2. The system of claim 1, wherein the first component is a task triaging component, wherein displaying the first portion of the plurality of information comprises presenting a status bar and a task completion component, and wherein the first user interaction comprises an update input associated with a pending task.

3. The system of claim 1, wherein the instructions are further operative to cause the processor to:
via the user interface, display a prompt to reflect, wherein the prompt to reflect is presented with a set of emotional state depictions, the set of emotional state depictions comprising a set of emojis.

4. The system of claim 1, wherein the instructions are further operative to cause the processor to:
display a virtual commute status bar, the virtual commute status bar indicating a progress of a user through the virtual commute experience.

5. The system of claim 1, wherein the plurality of information includes at least one of task data, calendar data, emotional state data, or meditation data.

6. The system of claim 1, wherein the ML model is further configured to dynamically launch, at a predetermined time of day, a prompt to initiate the virtual commute experience, wherein the predetermined time of day is a beginning of a workday or an end of the workday.

7. The system of claim 1, wherein the instructions operative to cause the processor to pause the notifications are further operative to:
in response to identifying a notification as work-related, pause the notification, wherein pausing the notification includes preventing output of the notification to the user interface until a later time; and in response to identifying the notification as non-work-related, allow the notification to be presented via the user interface.

8. A computer implemented method comprising:
extracting a plurality of information from a plurality of external applications, the plurality of information having one or more data formats, without separately opening the plurality of external applications;

in response to a trigger event, dynamically launching, by a machine learning (ML) model, a virtual commute experience via a user interface, wherein the virtual commute experience is an application that, when executed, includes:

in response to the launch of the virtual commute experience, displaying, on the user interface, via a first component of a plurality of components, a first portion of the plurality of information extracted from the plurality of external applications, the first portion having a first data format;

receiving a first user interaction to the first portion of the plurality of information;

in response to receiving the first user interaction:
updating, at the first component, a first entry associated with the first portion based on the first user interaction;

analyzing the first user interaction to generate a second entry for a second component of the plurality of components, wherein the second component is different from the first component;

adding the second entry to the second component;

updating data in the plurality of external applications based on the first user interaction without separately opening each of the plurality of external applications; and displaying a second portion of the plurality of information, the second portion having a second data format different from the first data format;

receiving a second user interaction to the second portion of the plurality of information;

outputting a prompt to continue or end the virtual commute experience; and in response to receiving a response to the prompt to end the virtual commute experience, pausing notifications generated by the plurality of external applications via the user interface until another trigger event, presenting an interactive summary of events of a workday during which the virtual commute experience is executed, and providing a visual celebration associated with the events of the workday.

9. The computer implemented method of claim 8, wherein the first component is a task triaging component, wherein displaying the first portion of the plurality of information comprises presenting a status bar and a task completion component, and wherein the first user interaction comprises an update input associated with a pending task.

10. The computer implemented method of claim 8, further comprising:
via the user interface, displaying a prompt to reflect, wherein the prompt to reflect is presented with a set of emotional state depictions, the set of emotional state depictions comprising a set of emojis.

11. The computer implemented method of claim 8, further comprising:
displaying a virtual commute status bar, the virtual commute status bar indicating a progress of a user through the virtual commute experience.

12. The computer implemented method of claim 8, wherein the plurality of information includes at least one of task data, calendar data, emotional state data, or meditation data.

13. The computer implemented method of claim 8, wherein the trigger event is at least one previous time of day at which the virtual commute experience was launched on the user interface.

14. The computer implemented method of claim 8, wherein pausing the notifications further comprises:
in response to identifying notification as work-related, pausing the notification, wherein the pausing includes preventing output of the notification to the user interface until a later time; and
in response to identifying the notification as non-work-related, allowing the notification to be presented via the user interface.

15. One or more computer storage media comprising a plurality of instructions that, when executed by a processor, cause the processor to:
extract a plurality of information from a plurality of external applications, the plurality of information having one or more data formats, without separately opening the plurality of external applications;
in response to a trigger event, dynamically launch, by a machine learning (ML) model implemented on the processor, a virtual commute experience via a user interface, wherein the virtual commute experience is an application that, when executed, includes:
in response to the launch of the virtual commute experience, displaying, on the user interface, via a first component of a plurality of components, a first portion of the plurality of information extracted from the plurality of external applications, the first portion having a first data format;
receiving a first user interaction to the first portion of the plurality of information;
in response to receiving the first user interaction:
updating, at the first component, a first entry associated with the first portion based on the first user interaction;
analyzing the first user interaction to generate a second entry for a second component of the plurality of components, wherein the second component is different from the first component;
adding the second entry to the second component;
updating data in the plurality of external applications based on the first user interaction without separately opening each of the plurality of external applications; and
displaying a second portion of the plurality of information, the second portion having a second data format different from the first data format;
receiving a second user interaction to the second portion of the plurality of information;
outputting a prompt to continue or end the virtual commute experience; and
in response to receiving a response to the prompt to end the virtual commute experience, pausing notifications generated by the plurality of external applications via the user interface until another trigger event, presenting an interactive summary of events of a workday during which the virtual commute experience is executed, and providing a visual celebration associated with the events of the workday.

16. The one or more computer storage media of claim 15, wherein the first component is a task triaging component, wherein displaying the first portion of the plurality of information comprises presenting a status bar and a task completion component, and wherein the first user interaction comprises an update input associated with a pending task.

17. The one or more computer storage media of claim 15, wherein the plurality of instructions further cause the processor to:
via the user interface, display a prompt to reflect, wherein the prompt to reflect is presented with a set of emotional state depictions, the set of emotional state depictions comprising a set of emojis.

* * * * *